(12) United States Patent
Takashima et al.

(10) Patent No.: US 9,183,411 B2
(45) Date of Patent: Nov. 10, 2015

(54) CRYPTOGRAPHIC PROCESSING SYSTEM, KEY GENERATION DEVICE, ENCRYPTION DEVICE, DECRYPTION DEVICE, CRYPTOGRAPHIC PROCESSING METHOD, AND CRYPTOGRAPHIC PROCESSING PROGRAM UTILIZING ATTRIBUTE INFORMATION FOR GENERATION OF A KEY FOR DECRYPTION OR ENCRYPTION

(75) Inventors: Katsuyuki Takashima, Tokyo (JP); Tatsuaki Okamoto, Tokyo (JP)

(73) Assignees: Mitsubishi Electric Corporation, Tokyo (JP); NIPPON TELEGRAPH AND TELEPHONE CORPORATION, Tokyo (JP)

( * ) Notice: Subject to any disclaimer, the term of this patent is extended or adjusted under 35 U.S.C. 154(b) by 81 days.

(21) Appl. No.: 14/003,485

(22) PCT Filed: Dec. 16, 2011

(86) PCT No.: PCT/JP2011/079176
§ 371 (c)(1),
(2), (4) Date: Sep. 6, 2013

(87) PCT Pub. No.: WO2012/132136
PCT Pub. Date: Oct. 4, 2012

(65) Prior Publication Data
US 2013/0339754 A1    Dec. 19, 2013

(30) Foreign Application Priority Data
Mar. 25, 2011   (JP) .................. 2011-067471

(51) Int. Cl.
*H04L 9/00*   (2006.01)
*H04L 9/32*   (2006.01)
(Continued)

(52) U.S. Cl.
CPC ............... *G06F 21/72* (2013.01); *H04L 9/085* (2013.01); *H04L 9/0847* (2013.01); *H04L 9/3073* (2013.01); *H04L 9/08* (2013.01); *H04L 9/0816* (2013.01); *H04L 63/061* (2013.01)

(58) Field of Classification Search
CPC ........ H04L 9/08; H04L 9/0816; H04L 63/061
USPC ............................... 713/189, 171; 380/44, 47
See application file for complete search history.

(56) References Cited

U.S. PATENT DOCUMENTS

2010/0172496 A1    7/2010 Furukawa
2010/0325412 A1 *  12/2010 Norrman et al. ............... 713/100
2013/0028415 A1 *  1/2013 Takashima et al. ............. 380/44

FOREIGN PATENT DOCUMENTS

WO    2008 146546    12/2008

OTHER PUBLICATIONS

Lewko, A. et al., "Decentralizing Attribute-Based Encryption", IACR ePrint Archive: Report 2010/351, (2010).
(Continued)

*Primary Examiner* — Aravind Moorthy
(74) *Attorney, Agent, or Firm* — Oblon, McClelland, Maier & Neustadt, L.L.P.

(57) ABSTRACT

A decentralized multi-authority functional encryption according to which the security of the whole system does not depend on a single party. Among a plurality of key generation devices, arbitrary one key generation device generates gparam, and each key generation device generates an authority public key and an authority secret key based on gparam. At least some key generation devices among the plurality of key generation devices generate a part of a decryption key of the user based on the authority secret key ask. The user forms one decryption by putting together the decryption keys generated by at least some of the key generation devices, and decrypts a ciphertext.

8 Claims, 15 Drawing Sheets

(51) Int. Cl.
*G06F 12/14* (2006.01)
*G06F 21/72* (2013.01)
*H04L 9/30* (2006.01)
*H04L 9/08* (2006.01)
*H04L 29/06* (2006.01)

(56) References Cited

OTHER PUBLICATIONS

Extended European Search Report issued Oct. 24, 2014 in Patent Application No. 11862602.7.
Tatsuaki Okamoto, et al., "Fully Secure Functional Encryption with General Relations from the Decisional Linear Assumption," http://eprint.iacr.org/eprint-bin/getfile.pl?entry=2010/563&version=20101105:113344&file=563.pdf, XP55147093A, Nov. 2010, pp. 1-49.
Yamamura, A., "3-2 A functional Cryptosystem Using a Group Action", Review of the National Institute of Information and Communications Technology, vol. 51, No. 1/2, pp. 101 to 110, (2005).
Lewko, A. et al., "Decentralizing Attribute-Based Encryption", Cryptology ePrint Archive: Report 2010/351, Version: 20110131: 012927, (online), (Jan. 31, 2011).
Chase, M., "Multi-Authority Attribute Based Encryption", TCC, LNCS, pp. 1 to 20, (2007).
Chase, M. et al., "Improving Privacy and Security in Multi-Authority Attribute-Based Encryption", ACM Conference on Computer and Communications Security, ACM, pp. 121 to 130, (2009).
Lin, H. et al., "Secure threshold multi authority attribute based encryption without a central authority", Indocrypt, LNCS, vol. 5365, pp. 426 to 436, (2008).
Muller, S. et al., "On Multi-Authority Ciphertext-Policy Attribute-Based Encryption", Bull. Korean Math Soc., The Korean Mathematical Society, vol. 46, No. 4, pp. 803 to 819, (2009).
Okamoto, T. et al. "Fully Secure Functional Encryption with General Relations from the Decisional Linear Assumption", T. Rabin (Ed.): Crypto, LNCS, vol. 6223, pp. 191 to 208, (2010).
Boneh, D. et al., "Conjunctive, Subset, and Range Queries on Encrypted Data", S.P. Vadhan (Ed.): TCC, LNCS, vol. 4392, pp. 535 to 554, (2007).
Katz, J. et al., "Predicate Encryption Supporting Disjunctions, Polynomial Equations, and Inner Products", Eurocrypt, pp. 146 to 162, (2008).
Shi, E. et al., "Delegating Capabilities in Predicate Encryption Systems", ICALP, pp. 1 to 35, (2008).
Okamoto, T. et al. "Hierarchical Predicate Encryption for Inner-Products", M. Matsui (Ed.): Asiacrypt, LNCS, vol. 5912, pp. 214 to 231, (2009).
Waters, B., "Dual System Encryption: Realizing Fully Secure IBE and HIBE under Simple Assumptions", Crypto, LNCS, vol. 5677, pp. 619 to 636, (2009).
Lewko, A. et al., "New Techniques for Dual System Encryption and Fully Secure Hibe with Short Ciphertexts", ePrint, IACR, Total pp. 22, (2009).
Lewko, A. et al. "Fully Secure Functional Encryption: Attribute-Based Encryption and (Hierarchical) Inner Product Encryption", H. Gilbert (Ed.) Eurocrypt, LNCS, vol. 6110, pp. 62 to 91, (2010).
International Search Report Issued Feb. 7, 2012 in PCT/JP11/79176 Filed Dec. 16, 2011.

\* cited by examiner

Fig. 4

$$s_0 = \underbrace{[1,\ldots,1]}_{r \text{ COLUMNS}} [f_1,\ldots,f_r] = \sum_{k=1}^{r} f_k$$

Fig. 5

$$\vec{s}^T = \begin{pmatrix} M_{1,1} & M_{1,2} & \cdots & M_{1,r} \\ M_{2,1} & M_{2,2} & \cdots & M_{2,r} \\ \vdots & & & \vdots \\ M_{L,1} & M_{L,2} & \cdots & M_{L,r} \end{pmatrix} \begin{pmatrix} f_1, & \cdots & , f_r \end{pmatrix} = \begin{pmatrix} s_1, & \cdots & , s_r \end{pmatrix}$$

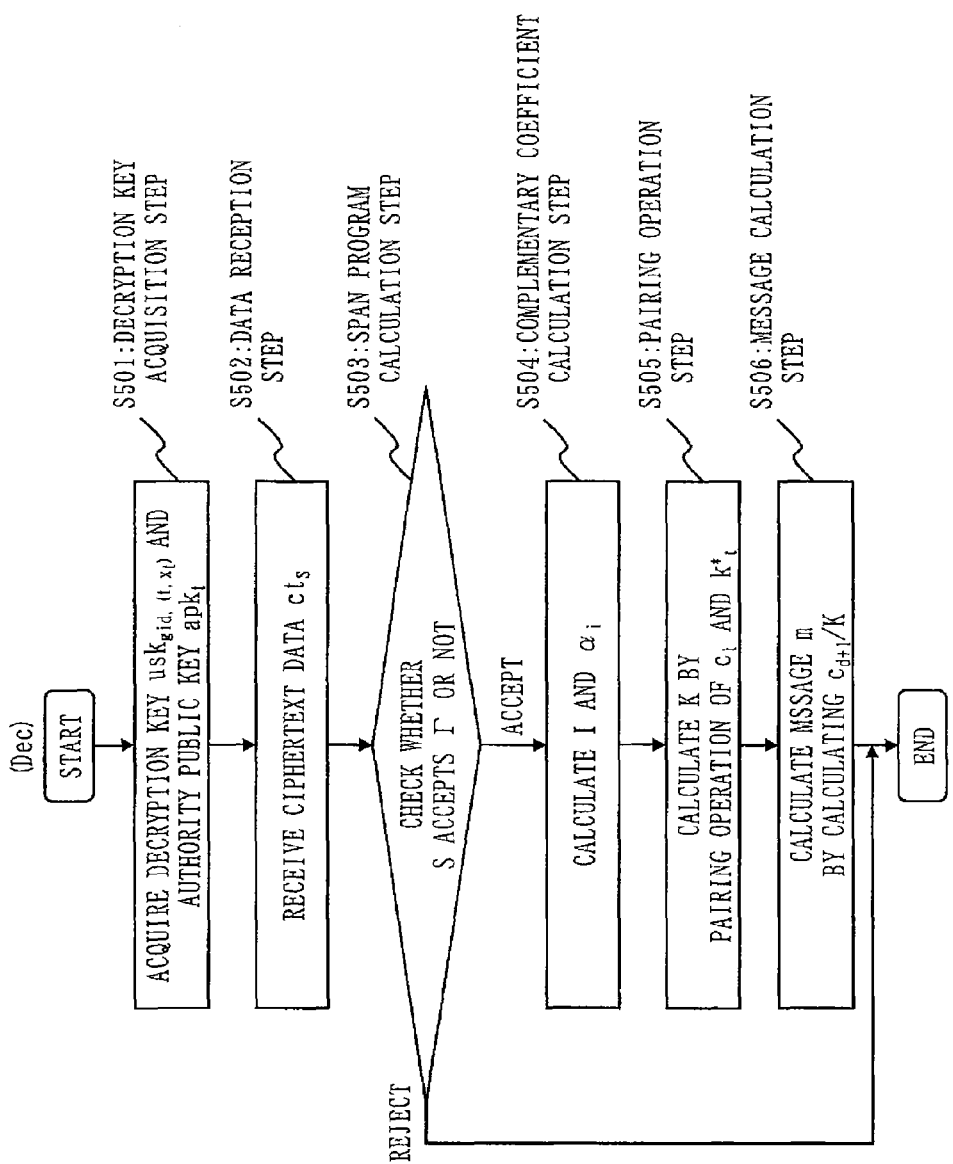

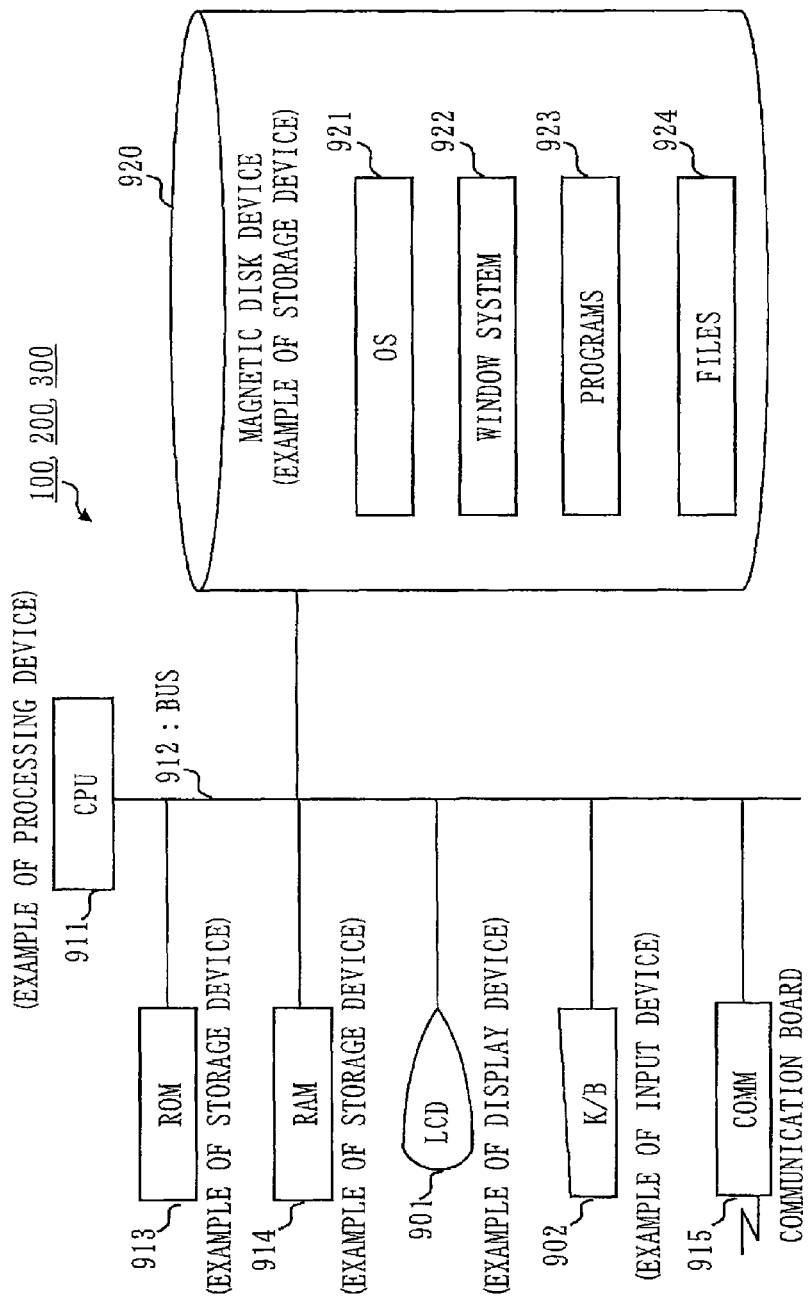

CRYPTOGRAPHIC PROCESSING SYSTEM, KEY GENERATION DEVICE, ENCRYPTION DEVICE, DECRYPTION DEVICE, CRYPTOGRAPHIC PROCESSING METHOD, AND CRYPTOGRAPHIC PROCESSING PROGRAM UTILIZING ATTRIBUTE INFORMATION FOR GENERATION OF A KEY FOR DECRYPTION OR ENCRYPTION

TECHNICAL FIELD

The present invention relates to decentralized multi-authority functional encryption.

BACKGROUND ART

Non-Patent Literature 31 describes functional encryption.
Non-Patent Literatures 12, 13, 25, 26, and 28 describe multi-authority attribute-based encryption. Attribute-based encryption is a class of functional encryption.
Non-Patent Literature 25 describes decentralized multi-authority attribute-based encryption.

CITATION LIST

Patent Literature

Non-Patent Literature 1: Beimel, A., Secure schemes for secret sharing and key distribution. Ph D Thesis, Israel Institute of Technology, Technion, Haifa, Israel, 1996.
Non-Patent Literature 2: Bethencourt, J., Sahai, A., Waters, B.: Ciphertext-policy attribute-based encryption. In: 2007 IEEE Symposium on Security and Privacy, pp. 321•34. IEEE Press (2007)
Non-Patent Literature 3: Boneh, D., Boyen, X.: Efficient selective-ID secure identity based encryption without random oracles. In: Cachin, C., Camenisch, J. (eds.) EUROCRYPT 2004. LNCS, vol. 3027, pp. 223•38. Springer Heidelberg (2004)
Non-Patent Literature 4: Boneh, D., Boyen, X.: Secure identity based encryption without random oracles. In: Franklin, M. K. (ed.) CRYPTO 2004. LNCS, vol. 3152, pp. 443•59. Springer Heidelberg (2004)
Non-Patent Literature 5: Boneh, D., Boyen, X., Goh, E.: Hierarchical identity based encryption with constant size ciphertext. In: Cramer, R (ed.) EUROCRYPT 2005. LNCS, vol. 3494, pp. 440•56. Springer Heidelberg (2005)
Non-Patent Literature 6: Boneh, D., Franklin, M.: Identity-based encryption from the Weil pairing. In: Kilian, J. (ed.) CRYPTO2001. LNCS, vol. 2139, pp. 213•29. Springer Heidelberg (2001)
Non-Patent Literature 7: Boneh, D., Hamburg, M.: Generalized identity based and broadcast encryption scheme. In: Pieprzyk, J. (ed.) ASIACRYPT 2008. LNCS, vol. 5350, pp. 455•70. Springer Heidelberg (2008)
Non-Patent Literature 8: Boneh, D., Katz, J., Improved efficiency for CCA-secure cryptosystems built using identity based encryption. RSA-CT 2005, LNCS, Springer Verlag (2005)
Non-Patent Literature 9: Boneh, D., Waters, B.: Conjunctive, subset, and range queries on encrypted data. In: Vadhan, S. P. (ed.) TCC 2007. LNCS, vol. 4392, pp. 535•54. Springer Heidelberg (2007)
Non-Patent Literature 10: Boyen, X., Waters, B.: Anonymous hierarchical identity-based encryption (without random oracles). In: Dwork, C. (ed.) CRYPTO 2006. LNCS, vol. 4117, pp. 290•07. Springer Heidelberg (2006)
Non-Patent Literature 11: Canetti, R., Halevi S., Katz J.: Chosen-ciphertext security from identity-based encryption. EUROCRYPT2004, LNCS, Springer Heidelberg (2004)
Non-Patent Literature 12: Chase, M.: Multi-authority attribute based encryption. TCC, LNCS, pp. 515•34, Springer Heidelberg (2007).
Non-Patent Literature 13: Chase, M. and Chow, S.: Improving privacy and security in multi-authority attribute-based encryption, ACM Conference on Computer and Communications Security, pp. 121•30, ACM (2009).
Non-Patent Literature 14: Cocks, C.: An identity based encryption scheme based on quadratic residues. In: Honary, B. (ed.) IMAInt. Conf LNCS, vol. 2260, pp. 360•63. Springer Heidelberg (2001)
Non-Patent Literature 15: Estibals, N.: Compact hardware for computing the Tate pairing over 128-bit-security supersingular curves, IACR ePrint Archive: Report 2010/371 (2010).
Non-Patent Literature 16: SECURE HASH STANDARD, FIPS PUB 180-1, 180-2, NIST, USA (1995, 2002)
Non-Patent Literature 17: Gentry, C.: Practical identity-based encryption without random oracles. In: Vaudenay, S. (ed.) EUROCRYPT2006. LNCS, vol. 4004, pp. 445•64. Springer Heidelberg (2006)
Non-Patent Literature 18: Gentry, C., Halevi, S.: Hierarchical identity-based encryption with polynomially many levels. In: Reingold, O. (ed.) TCC 2009. LNCS, vol. 5444, pp. 437•56. Springer Heidelberg (2009)
Non-Patent Literature 19: Gentry, C., Silverberg, A.: Hierarchical ID-based cryptography. In: Zheng, Y. (ed.) ASIACRYPT 2002.LNCS, vol. 2501, pp. 548•66. Springer Heidelberg (2002)
Non-Patent Literature 20: Goyal, V., Pandey, O., Sahai, A., Waters, B.: Attribute-based encryption for fine-grained access control of encrypted data. In: ACM Conference on Computer and Communication Security 2006, pp. 89•8, ACM (2006)
Non-Patent Literature 21: ISO/IEC 15946-5, Information technology •Security techniques •Cryptographic techniques based on elliptic curves •Part 5: Elliptic curve generation (2009).
Non-Patent Literature 22: Katz, J., Sahai, A., Waters, B.: Predicate encryption supporting disjunctions, polynomial equations, and inner products. In: Smart, N. P. (ed.) EUROCRYPT 2008. LNCS, voL 4965, pp. 146•62. Springer Heidelberg (2008)
Non-Patent Literature 23: Lewko, A., Okamoto, T., Sahai, A., Takashima, K., Waters, B.: Fully secure functional encryption: Attribute-based encryption and (hierarchical) inner product encryption, EUROCRYPT 2010. LNCS, Springer Heidelberg (2010)
Non-Patent Literature 24: Lewko, A. B., Waters, B.: New techniques for dual system encryption and fully secure HIBE with short ciphertexts. In: Micciancio, D. (ed.) TCC 2010. LNCS, vol. 5978, pp. 455•79. Springer Heidelberg (2010)
Non-Patent Literature 25: Lewko, A. B., Waters, B.: Decentralizing Attribute-Based Encryption, IACR ePrint Archive: Report 2010/351 (2010).
Non-Patent Literature 26: H. Lin, Z. Cao, X. Liang, and J. Shao.: Secure threshold multi authority attribute based encryption without a central authority, INDOCRYPT, LNCS, vol. 5365, pp. 426•36, Springer Heidelberg (2008).
Non-Patent Literature 27: Maji, H., Prabhakaran, M., Rosulek, M.: Attribute-Based Signatures. http://www.c-s.uiuc.edu/~mmp/research.html Non-Patent Literature 28: S. Muller, S. Katzenbeisser, and C. Eckert.; On multi-authority ciphertext-policy attribute-based encryption, Bull. Korean Math Soc. 46, No. 4, pp. 803•19 (2009).

Non-Patent Literature 29: Okamoto, T., Takashima, K.: Homomorphic encryption and signatures from vector decomposition. In: Galbraith, S. D., Paterson, K. G. (eds.) Pairing 2008. LNCS, vol. 5209, pp. 57•4, Springer Heidelberg (2008)

Non-Patent Literature 30: Okamoto, T., Takashima, K.: Hierarchical predicate encryption for inner-products, In: ASIACRYPT 2009, Springer Heidelberg (2009)

Non-Patent Literature 31: Okamoto, T., Takashima, K.: Fully Secure Functional Encryption with General Relations from the Decisional Linear Assumption, In: CRYPTO 2010, Springer Heidelberg (2010)

Non-Patent Literature 32: Ostrovsky, R, Sahai, A., Waters, B.: Attribute-based encryption with non-monotonic access structures. In: ACM Conference on Computer and Communication Security 2007, pp. 195•03, ACM (2007)

Non-Patent Literature 33: Pirretti, M., Traynor, P., McDaniel, P., Waters, B.: Secure attribute-based systems. In: ACM Conference on Computer and Communication Security 2006, pp. 99•12, ACM, (2006)

Non-Patent Literature 34: Sahai, A., Waters, B.: Fuzzy identity-based encryption. In: Cramer, R. (ed.) EUROCRYPT 2005. LNCS, vol. 3494, pp. 457•73. Springer Heidelberg (2005)

Non-Patent Literature 35: Shi, E., Waters, B.: Delegating capability in predicate encryption systems. In: Aceto, L., Damgard, I., Goldberg, L. A., Halldorsson, M. M., Ingolfsdottir, A., Walukiewicz, I. (eds.) ICALP (2) 2008. LNCS, vol. 5126, pp. 560.578. Springer Heidelberg (2008)

Non-Patent Literature 36: Waters, B.: Efficient identity based encryption without random oracles. Eurocrypt 2005, LNCS, vol. 3152, pp. 443•59. Springer Verlag, (2005)

Non-Patent Literature 37: Waters, B.: Ciphertext-policy attribute-based encryption: an expressive, efficient, and provably secure realization. ePrint, IACR, http://eprint.iacr.org/2008/290

Non-Patent Literature 38: Waters, B.: Dual system encryption: realizing fully secure IBE and HIBE under simple assumptions. In: Halevi, S. (ed.) CRYPTO 2009. LNCS, vol. 5677, pp. 619•36. Springer Heidelberg (2009)

SUMMARY OF INVENTION

Technical Problem

Functional encryption has a problem that the security of the whole system depends on a single party.

The present invention has as its object to provide decentralized multi-authority functional encryption in which the security of the whole system does not depend on a single party.

Solution to Problem

A cryptographic processing system according to the present invention is a cryptographic processing system including d (d is an integer of 1 or more) units of key generation devices, an encryption device, and a decryption device, and serving to execute a cryptographic process using a basis $B_t$ and a basis $B^*_t$ for at least one integer $t=1, \ldots, d$, wherein each key generation device of the d units of key generation devices includes a first information input part which takes as input attribute information $x^{\rightarrow}_t := (x_{t,i})$ ($i=1, \ldots, n_t$ where $n_t$ is an integer of 1 or more) for an integer t among integers $t=1, \ldots, d$ which is predetermined for each key generation device, a key element generation part which generates a key element $k^*_t$ including a vector indicated in Formula 1 based on the integer t, the attribute information $x^{\rightarrow}_t$ inputted by the first information input part, a predetermined value $\delta$, and a basis vector $b^*_{t,i}$ ($i=1, \ldots, 2n_t$) of the basis $B^*_t$, and a decryption key transmission part which transmits to the decryption device, a decryption key usk including the key element $k^*_t$ generated by the key element generation part and the attribute information) $x^{\rightarrow}_t$, wherein the encryption device includes a second information input part which takes as input a variable $\rho(i)$ for each integer $i=1, \ldots, L$ (L is an integer of 1 or more), which variable $\rho(i)$ is either one of a positive tuple $(t, v^{\rightarrow}_i)$ and a negative tuple $\neg (t, v^{\rightarrow}_i)$ of the identification information t (t is any one integer of $t=1, \ldots, d$) and attribute information $v^{\rightarrow}_i := (v_{i,i'})$ ($i'=1, \ldots, n_t$); and a predetermined matrix M having L rows and r columns (r is an integer of 1 or more), a vector generation part which generates a column vector $s^{\rightarrow T} := (s_1, \ldots, s_L)^T := M \cdot f^{\rightarrow T}$ based on a vector $f^{\rightarrow}$ having r pieces of elements and the matrix M inputted by the second information input part, and generates a column vector $(s^{\rightarrow \prime})^T := (s_1', \ldots, s_L') := M \cdot (f^{\rightarrow \prime})^T$ based on the matrix M and a vector $f^{\rightarrow \prime}$ having r pieces of elements and satisfying $s_0 = h^{\rightarrow} \cdot (f^{\rightarrow \prime})^T$ where $s_0 = h^{\rightarrow} \cdot f^{\rightarrow T}$, a cipher element $c_i$ generation part which, for each integer $i=1, \ldots, L$ and based on the column vector $s^{\rightarrow T}$ and the column vector $(s^{\rightarrow \prime})^T$ which are generated by the vector generation part, and predetermined values $\theta_i$ and $\theta_i'$ for each integer $i=1, \ldots, L$, generates a cipher element $c_i$ including a vector indicated in Formula 2, when the variable $\rho(i)$ is a positive tuple $(t, v^{\rightarrow}_i)$, using a basis vector $b_{t,i'}$ ($i'=1, \ldots, 2n_t$) of the basis $B_t$ indicated by identification information t of the positive tuple, and generates a cipher element $c_i$ including a vector indicated in Formula 3, when the variable $\rho(i)$ is a negative tuple $\neg (t, v^{\rightarrow}_i)$, using a basis vector $b_{t,i}$ ($i=1, \ldots, 2n_t$) indicated by identification information t of the negative tuple, and a ciphertext transmission part which transmits to the decryption device, a ciphertext $ct_s$ including: the cipher element $c_i$ generated for each integer $i=1, \ldots, L$ by the cipher element $c_i$ generation part; the variable $\rho(i)$; and the matrix M, and wherein the decryption device includes a decryption key reception part which receives the decryption key usk transmitted by the decryption key transmission part of at least one key generation device among the d units of key generation devices, a data reception part which receives the ciphertext $ct_s$ transmitted by the ciphertext transmission part, a complementary coefficient calculation part which, based on the attribute information $x^{\rightarrow}_t$ included in the decryption key usk received by the decryption key reception part, and the variable $\rho(i)$ included in the ciphertext $ct_s$ received by the data reception part, specifies, among integers $i=1, \ldots, L$, a set I of an integer i for which the variable $\rho(i)$ is a positive tuple $(t, v^{\rightarrow}_i)$, the decryption key usk including $x^{\rightarrow}_t$ indicated by identification information t of the positive tuple being received by the decryption key reception part, and with which an inner-product of $v^{\rightarrow}_i$ of the positive tuple and the attribute information $x^{\rightarrow}_t$ indicated by the identification information t of the positive tuple becomes 0, and an integer i for which the variable $\rho(i)$ is a negative tuple $\neg (t, v^{\rightarrow}_i)$, the decryption key usk including $\vec{x}_t$ indicated by identification information t of the negative tuple being received by the decryption key reception part, and with which an inner-product of $\vec{v}_i$ of the negative tuple and the attribute information $\vec{x}_t$ indicated by the identification information t of the negative tuple does not become 0; and calculates, concerning i included in the set I specified, a complementary coefficient $\alpha_i$ with which a total of $\alpha_i M_i$ based on $M_i$ which is an element on an i-th row of the matrix M included in the ciphertext $ct_s$ becomes the predetermined vector $\vec{h}$, and a pairing operation part which calculates predetermined information K by conducting a pairing operation indicated in Formula 4 for the cipher element $c_i$ included in the ciphertext $ct_s$ and the key element $k^*_t$ included in the decryption key usk based on the set I and the complementary coefficient $\alpha_i$ which are calculated by the complementary coefficient calculation part.

$$\left( \overbrace{(\delta+1)x_{t,1}, \ldots, (\delta+1)x_{t,n_t}}^{n_t}, \overbrace{-\delta x_{t,1}, \ldots, -\delta x_{t,n_t}}^{n_t}, 0; \ldots, 0 \right)_{\mathbb{B}^*_j} \quad \text{[Formula 1]}$$

$$\left( \overbrace{s_i + \theta_i v_{i,1}, \theta_i v_{i,2}, \ldots, \theta_i v_{i,n_t}}^{n_t}, \right.$$
$$\left. \overbrace{s'_i + \theta'_i v_{i,1}, \theta'_i v_{i,2}, \ldots, \theta'_i v_{i,n_t}}^{n_t}, 0, \ldots, 0 \right)_{\mathbb{B}_j} \quad \text{[Formula 2]}$$

$$\left( \overbrace{s_i v_{i,1}, \ldots, s_i v_{i,n_t}}^{n_t}, \overbrace{s'_i v_{i,1}, \ldots s' v_{i,n_t}}^{n_t}, 0, \ldots, 0 \right)_{\mathbb{B}_j} \quad \text{[Formula 3]}$$

$$K := \prod_{i \in I \wedge \rho(i)=(t,\vec{v}_i)} e(c_i, k^*_t)^{\alpha_i} \cdot \prod_{i \in I \wedge \rho(i)=\neg(t,\vec{v}_i)} e(c_i, k^*_t)^{\alpha_i/(\vec{v}_i \cdot \vec{x}_t)} \quad \text{[Formula 4]}$$

Advantageous Effects of Invention

In a cryptographic processing system according to the present invention, each of the plurality of key generation devices generates a part of a decryption key. Hence, even if the securities of some of the key generation devices are broken, only the function of a part of the decryption key is lost, and the security of the whole system will not be broken.

BRIEF DESCRIPTION OF DRAWINGS

FIG. 4 is an explanatory drawing of $s_0$.
FIG. 5 is an explanatory drawing of $\vec{s}^T$.
FIG. 14 is a flowchart showing the process of Dec algorithm.
FIG. 15 is a diagram showing an example of the hardware configuration of the key generation device 100, the encryption device 200, and the decryption device.

DESCRIPTION OF EMBODIMENTS

Figure 1:
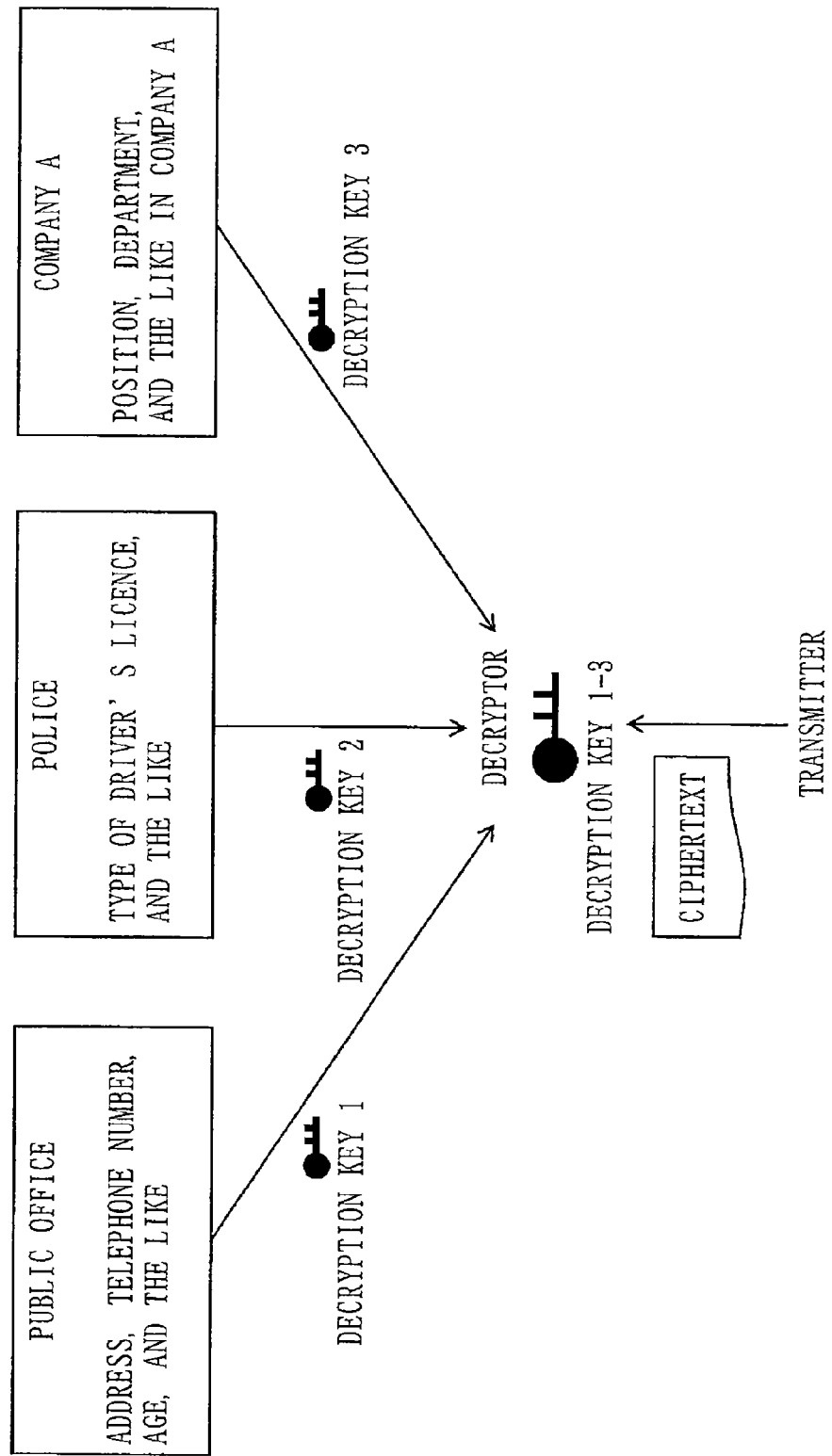
FIG. 1 is an explanatory drawing of multi-authority.

Embodiments of the present invention will be described hereinafter with reference to the accompanying drawings.

In the following description, a processing device is, for example, a CPU 911 (to be described later). A storage device is, for example, a ROM 913, a RAM 914, or a magnetic disk 920 (each will be described later). A communication device is, for example, a communication board 915 (to be described later). An input device is, for example, a keyboard 902 or the communication board 915 (each will be described later). Namely, the processing device, the storage device, the communication device, and the input device are hardware.

The notation in the following description will be explained.

When A is a random variable or distribution, Formula 101 denotes that y is randomly selected from A according to the distribution of A. Namely, in Formula 101, y is a random number.

$$y \xleftarrow{R} A \quad \text{[Formula 101]}$$

When A is a set, Formula 102 denotes that y is uniformly selected from A. Namely, in Formula 102, y is a uniform random number.

$$y \xleftarrow{U} A \quad \text{[Formula 102]}$$

Formula 103 denotes that y is a set, defined or substituted by z.

$$y := z \quad \text{[Formula 103]}$$

When a is a fixed value, Formula 104 denotes an event that a machine (algorithm) A outputs a on input x.

$$A(x) \to a \quad \text{[Formula 104]}$$

For example, $$A(x) \to 1$$

Formula 105, namely, $\mathbb{F}_q$, denotes a finite field of order q.

$$\mathbb{F}_q \quad \text{[Formula 105]}$$

A vector symbol denotes a vector representation over the finite field $\mathbb{F}_q$. Namely, Formula 106 is established.
$\vec{x}$ denotes $$(x_1, \ldots, x_n) \in \mathbb{F}_q^n$$

Formula 107 denotes the inner-product, indicated by Formula 109, of two vectors $\vec{x}$ and $\vec{v}$ indicated in Formula 108.

$$\vec{x} \cdot \vec{v} \quad \text{[Formula 107]}$$

$$\vec{x} = (x_1, \ldots, x_n),$$

$$\vec{v} = (v_1, \ldots, v_n) \quad \text{[Formula 108]}$$

$$\Sigma_{i=1}^{n} x_i v_i \quad \text{[Formula 109]}$$

Note that $X^T$ denotes the transpose of matrix M.

Note that for bases B and B* indicated in Formula 110, Formula 111 is established.

$$\mathbb{B} := (b_1, \ldots, b_N),$$

$$\mathbb{B}^* := (b_1^*, \ldots, b_N^*) \quad \text{[Formula 110]}$$

$$(x_1, \ldots, x_N)_{\mathbb{B}} := \Sigma_{i=1}^{N} x_i b_i,$$

$$(y_1, \ldots, y_N)_{\mathbb{B}^*} := \Sigma_{i=1}^{N} y_i b_i^* \quad \text{[Formula 111]}$$

Note that $\vec{e}_{t,j}$ indicates a normal basis vector shown in Formula 112.

$$\vec{e}_{t,j} := (\overbrace{0 \cdots 0}^{j-1}, 1, \overbrace{0 \cdots 0}^{n_t - j}) \in \mathbb{F}_q^{n_t} \text{ for } j = 1, \ldots, n_t \quad \text{[Formula 112]}$$

In the following description, when "nt" is indicated as a subscript or superscript, nt is $n_t$. Likewise, when "Vt" is indicated as a subscript or superscript, Vt is $V_t$. Likewise, when "δi,j" is indicated as a superscript, δi,j is $\delta_{i,j}$.

When "→" indicating a vector is attached to a subscript or superscript, "→" is attached as a superscript to the subscript or superscript.

Also, xt in a decryption key $usk_{gid,(t,xt)}$ represents $x_t$.

In the following description, a cryptographic process includes a key generation process, an encryption process, and a decryption process.

Embodiment 1

This embodiment describes a basic concept for implementing the "decentralized multi-authority functional encryption", and then describes the structure of the decentralized multi-authority functional encryption.

First, the decentralized multi-authority functional encryption will be briefly described: functional encryption will be described, and then decentralized multi-authority will be described.

Second, a space having a rich mathematical structure called "dual pairing vector spaces (DPVS)" which is a space for implementing the functional encryption will be described.

Third, a concept for implementing the functional encryption will be described. Here, "span program", "the inner-product of attribute vectors, and an access structure", and "secret distribution (secret sharing)" will be described.

Fourth, "decentralized multi-authority functional encryption" according to this embodiment will be described. Initially, the basic structure of the "decentralized multi-authority functional encryption" will be described. Subsequently, the basic structure of a "cryptographic processing system 10" which implements the "decentralized multi-authority functional encryption" will be described. Then, "decentralized multi-authority functional encryption" and a "cryptographic processing system 10" according to this embodiment will be described in detail.

<1. Decentralized Multi-Authority Functional Encryption>

<1-1. Functional Encryption>

Functional encryption is an advanced (fine-grained) notion of public key encryption that covers ID-based encryption (identity-based encryption, IBE) (see Non-Patent Literatures 3, 4, 6, 14, and 17), hidden-vector encryption (see Non-Patent Literature 9), predicate encryption (see Non-Patent Literature 22), and attribute-based encryption (ABE, see Non-Patent Literatures, 2, 20, and 32-34) as special cases.

A decryption key, $sk_\psi$ (secret key), in functional encryption is associated with a parameter, $\psi$, and message m is encrypted to a ciphertext Enc(m, pk, γ) using a public key pk along with a parameter γ which is different from the parameter $\psi$. The decryption key $sk_\psi$ can decrypt a ciphertext Enc(m, pk, γ) if and only if a relation R($\psi$, γ) holds.

The functional encryption requires a trusted party called an authority. The authority generates a pair of public key pk and master secret key msk. The public key pk is distributed as a system parameter. The master secret key is used to generate a user's decryption key $sk_\psi$ that is associated with the user's parameter, $\psi$.

In the case of ID-based encryption, the parameter w is user's ID, and the relation R is the equality, i.e., the relation R($\psi$, γ) holds if and only if $\psi = \gamma$.

In CP (ciphertext-policy) attribute-based encryption for a general access structure, a parameter $\psi$ is a tuple $(x_1, \ldots, x_i)$ of user attributes, and a relation R(•, γ) is a general access structure. More precisely, the relation R(•, γ) is expressed by (M^, $(v_1, \ldots, v_i)$), and the component-wise equality relations for attribute components, i.e., $\{x_t = v_t\}_{t \in \{1, \ldots, i\}}$, are inputted to a (monotone) span program M^, and the relation R($\psi$, γ) holds if and only if the true-value vector of $(T(x_1 = v_1), \ldots, T(x_i = v_i))$ is accepted by the span program M^, where T($\psi$):=1 if $\psi$ is true, and T($\psi$):=0 if $\psi$ is false. For example, T(x=v):=1 if x=v, and T(x=v):=0 if x≠v.

Although functional encryption has many applications, a big problem in the notion is that the security of the whole system depends on a single party. In other words, if the authority is corrupted, or the master secret key is compromised, the system will stop functioning.

<1-2. Decentralized Multi-Authority>

Initially, the "multi-authority" will be explained. Multi-authority signifies the presence of a plurality of authorities who generate the user's decryption key.

As described above, in an ordinary functional encryption, the security of the whole system depends on one certain party (authority). With the multi-authority scheme, however, even if the security of some authority is corrupted or the secret key (master key) of some authority is compromised, only part of the system stops functioning, and the remaining portion of the system can function normally.

FIG. 1 is an explanatory drawing of the multi-authority.

In FIG. 1, a public office manages attributes such as the address, telephone number, and age. The police manage attributes such as the type of the driver's license. A company A manages attributes such as the position in the company A and the belonging department in the company A. A decryption key 1 associated with the attributes managed by the public office is issued by the public office. A decryption key 2 associated with the attributes managed by the police is issued by the police. A decryption key 3 associated with the attributes managed by the company A is issued by the company A.

The decryptor who decrypts a ciphertext decrypts the ciphertext using a decryption key formed by putting together the decryption keys 1, 2, and 3 issued by the respective authorities such as the public office, the police, and the company A. Namely, when seen from the decryptor, a decryption key formed by putting together the decryption keys issued by the respective authorities is the single decryption key issued to him or her.

For example, in a case where the master key of the company A is compromised, although the cryptographic processing system does not function regarding the attributes of the company A, it functions regarding the attributes managed by the other authorities. Namely, although concerning the attributes managed by the company A there is a risk of decryption by a user having attributes other than the specified attributes, concerning attributes other than those managed by the company A, decryption is possible only by a user having the specified attributes.

As is seen from the example of FIG. 1, according to the functional encryption, it is normal that a plurality of authorities are present, and that each authority manages a certain category (subspace) or definition range in the attributes and issues (a part of) a decryption key regarding the attribute of the user in this category.

The notion "decentralized" will be explained. Being decentralized means that any party can serve as an authority and issue (a part of) the decryption key without interacting with the other parties, and that each user can acquire (a part of) the decryption key without interacting with the other parties.

For example, if a central authority exists, the system is not decentralized. A central authority is an authority superior to the other authorities. If the security of the central authority is corrupted, the security of every authority will be corrupted.

<2. Dual Pairing Vector Spaces>

First, symmetric bilinear pairing groups will be described.

The symmetric bilinear pairing groups $(q, G, G^T, g, e)$ are a tuple of a prime q, a cyclic additive group G of order q, a cyclic multiplicative group $G^T$ of order q, $g \neq 0 \in G$, and a polynomial-time computable nondegenerate bilinear pairing e: $G \times G \to G_T$. The nondegenerate bilinear pairing signifies $e(sg, tg) = e(g, g)^{st}$, and $e(g, g) \neq 1$.

In the following description, let Formula 113 be an algorithm that takes as input $1^\lambda$ and outputs the values of a parameter $param_G := (q, G, G_T, g, e)$ of bilinear pairing groups with a security parameter $\lambda$.

$$\mathcal{G}_{bpg}$$ [Formula 113]

Dual pairing vector spaces will now be described.

Dual pairing vector spaces $(q, V, G_T, A, e)$ can be constituted by a direct product of symmetric bilinear pairing groups $(param_G := (q, G, G_T, g, e))$. The dual pairing vector spaces $(q, V, G_T, A, e)$ are a tuple of a prime q, an N-dimensional vector space V over $F_q$ indicated in Formula 114, a cyclic group $G_T$ of the order q, and a canonical basis $A := (a_1, \ldots, a_N)$ of the space V, and have the following operations (1) and (2) where $a_i$ is as indicated in Formula 115.

$$\mathbb{V} := \overbrace{\mathbb{G} \times \cdots \times \mathbb{G}}^{N}$$ [Formula 114]

$$a_i := (\overbrace{0, \ldots, 0}^{i-1}, g, \overbrace{0, \ldots, 0}^{N-i})$$ [Formula 115]

Operation (1): Nondegenerate Bilinear Pairing

The pairing on the space V is defined by Formula 116.

$$e(x,y) := \Pi_{i=1}^N e(G_i, H_i) \in \mathbb{G}_T$$ [Formula 116]

where $(G_1, \ldots, G_N) := x \in \mathbb{V}$, $(H_1, \ldots, H_N) := y \in \mathbb{V}$ This is nondegenerate bilinear, i.e., $e(sx, ty) = e(s, y)^{st}$ and if $e(x, y) = 1$ for all $y \in V$, then $x = 0$. For all i and j, $e(a_i, a_j) = e(g, g)^{\delta_{i,j}}$ where $\delta_{i,j} = 1$ if $i = j$, and $\delta_{i,j} = 0$ if $i \neq j$. Also, $e(g, g) \neq 1 \in G_T$.

Operation (2): Distortion Maps

Linear transformation $\phi_{i,j}$ on the space V indicated in Formula 117 can achieve Formula 118.

$$\phi_{i,j}(a_j) = a_i$$ [Formula 117]
if $k \neq j$ then $\phi_{i,j}(a_k) = 0$ $$\phi_{i,j}(x) := (\overbrace{0, \ldots, 0}^{i-1}, g_j, \overbrace{0, \ldots, 0}^{N-i})$$ [Formula 118]

Note that $x := (g_1, \ldots, g_N)$

Linear transformation $\phi_{i,j}$ will be called distortion maps.

In the following description, let Formula 119 be an algorithm that takes as input, $1^\lambda$ ($\lambda \in$ natural number), N∈natural number, and the values of the parameter $param_G := (q, G, G_T, g, e)$ of bilinear pairing groups, and outputs the values of a parameter $param_v := (q, V, G_T, A, e)$ of dual pairing vector spaces which have a security parameter $\lambda$ and which form an N-dimensional space V.

$$\mathcal{G}_{dpvs}$$ [Formula 119]

A case will be described where dual pairing vector spaces are constructed from the symmetric bilinear pairing groups described above. Dual pairing vector spaces can be constructed from asymmetric bilinear pairing groups as well. The following description can be easily applied to a case where dual pairing vector spaces are constructed from asymmetric bilinear pairing groups.

<3. Concept for Implementing Functional Encryption>

<3-1. Span Program>

Figure 2:
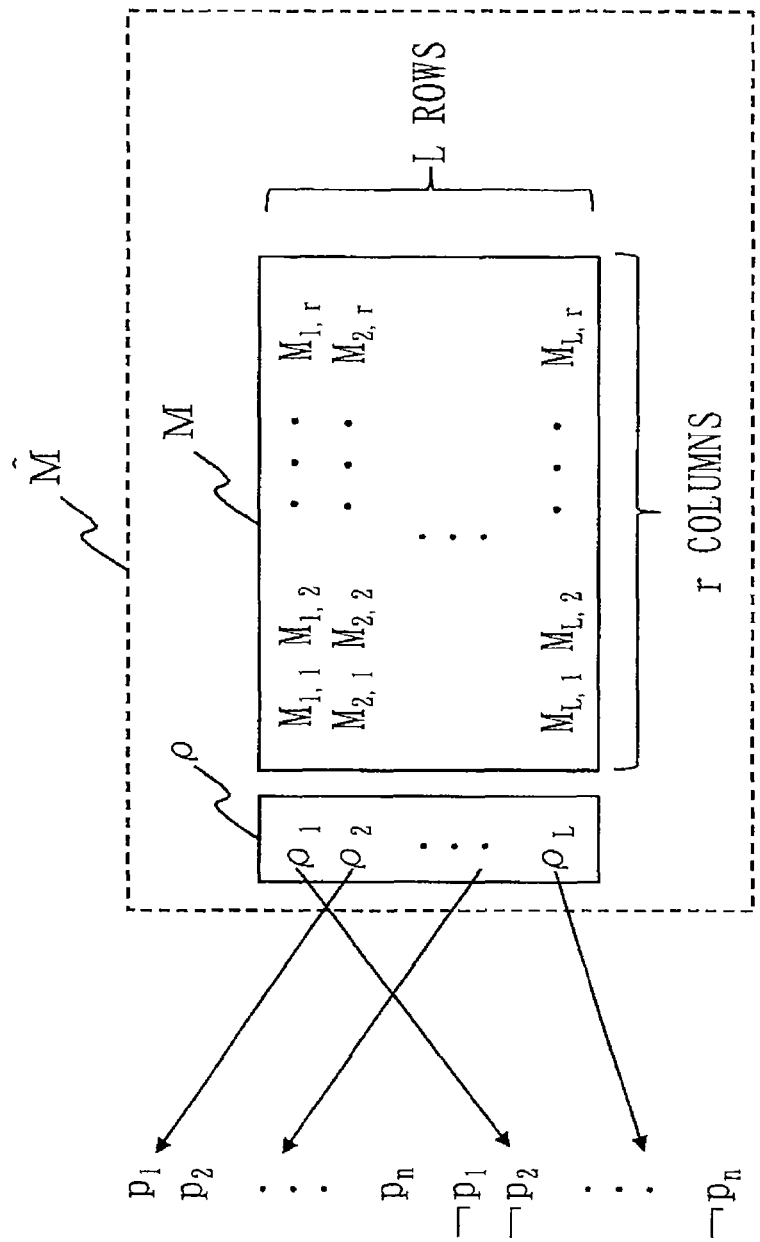
FIG. 2 is an explanatory drawing of a matrix $M^{\wedge}$.

FIG. 2 is an explanatory drawing of a matrix M^.

Let $\{p_1, \ldots p_n\}$ be a set of variables. M^:=(M, $\rho$) is a labeled matrix where the matrix M is an (L rows×r columns) matrix over $F_q$, and $\rho$ is a label of each row of the matrix M and is related to one of literals $\{p_1, \ldots p_n, \neg p_1, \ldots, \neg p_n\}$. A label $\rho_i$ (i=1, ..., L) of every row of M is related to one of the literals, namely, $\rho: \{1, \ldots, L\} \to \{p_1, \ldots, p_n, \neg p_1, \ldots, \neg p_n\}$.

For every input sequence $\delta \in \{0, 1\}^n$, a submatrix $M_\delta$ of the matrix M is defined. The matrix $M_\delta$ is a submatrix consisting of those rows of the matrix M, whose labels $\rho$ are related to value "1" by the input sequence $\delta$. Namely, the matrix $M_\delta$ is a submatrix consisting of the rows of the matrix M which are related to $p_i$ with which $\delta_i = 1$ and the rows of the matrix M which are related to $\neg p_i$ with which $\delta_i = 0$.

Figure 3:
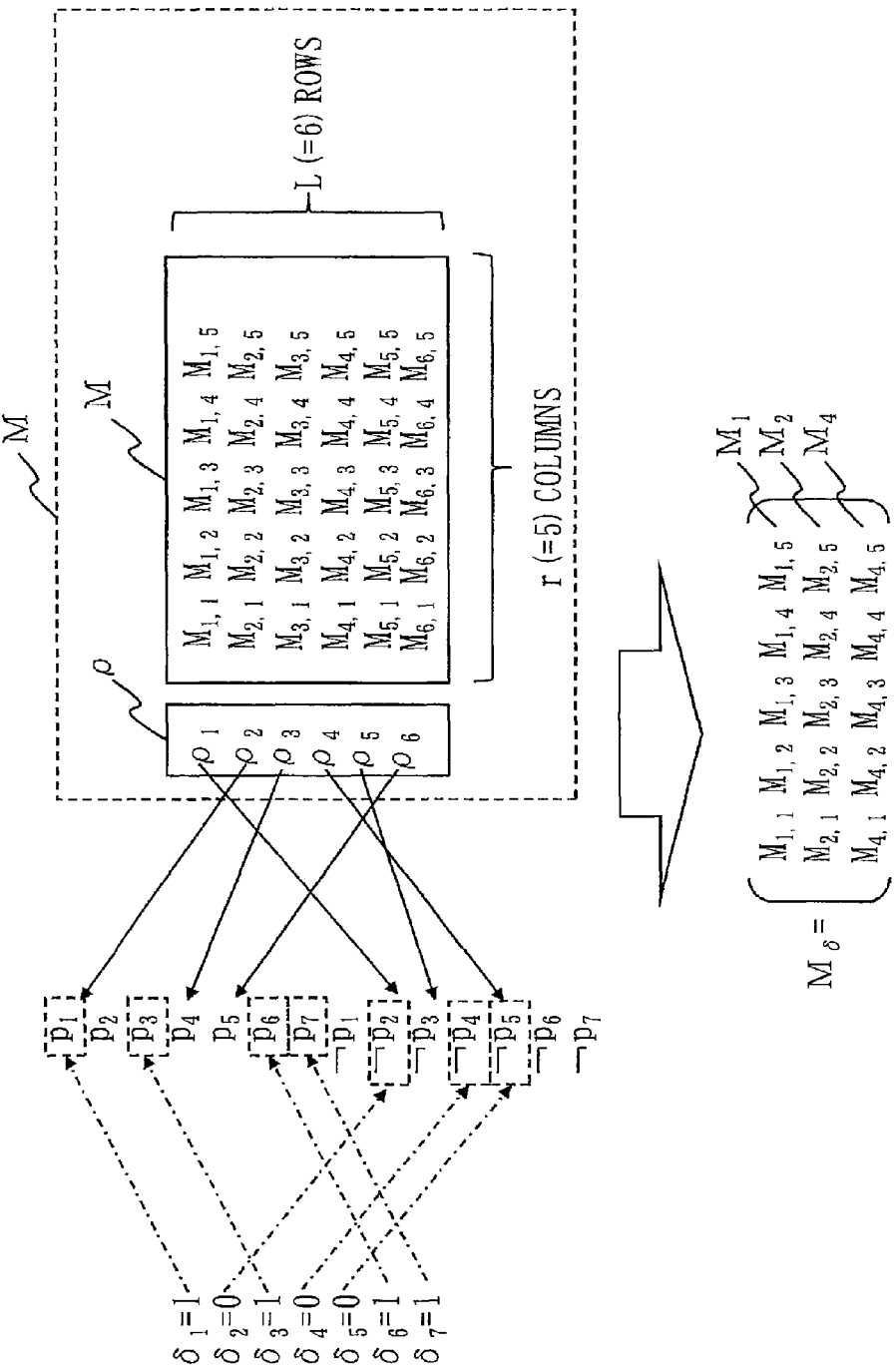
FIG. 3 is an explanatory drawing of a matrix $M_\delta$.

FIG. 3 is an explanatory drawing of the matrix $M_\delta$. Note that in FIG. 3, n=7, L=6, and r=5. That is, the set of variables is $\{p_1, \ldots, p_7\}$, and the matrix M is a (6 rows×5 columns) matrix. In FIG. 3, assume that the labels $\rho$ are related such that $\rho_1$ corresponds to $\neg p_2$, $\rho_2$ to $p_1$, $\rho_3$ to $p_4$, $\rho_4$ to $\neg p_5$, $\rho_5$ to $\neg p_3$, and $\rho_6$ to $\neg p_5$.

Assume that in an input sequence $\delta \in \{0,1\}^7$, $\delta_1 = 1$, $\delta_2 = 0$, $\delta_3 = 1$, $\delta_4 = 0$, $\delta_5 = 0$, $\delta_6 = 1$, and $\delta_7 = 1$. In this case, a submatrix consisting of the rows of the matrix M which are related to literals ($p_1, p_3, p_6, p_7, \neg p_2, \neg_4, \neg p_5$) surrounded by broken lines is the matrix $M_\delta$. That is, the submatrix consisting of the 1st row ($M_1$), 2nd row ($M_2$), and 4th row ($M_4$) of the matrix M is the matrix $M_\delta$.

In other words, when map $\gamma: \{1, \ldots, L\} \to \{0, 1\}$ is $[\rho(j) = p_i] \wedge [\delta_i = 1]$ or $[\rho(j) = \neg p_i] \wedge [\delta_i = 0]$, then $\gamma(j) = 1$; otherwise $\gamma(j) = 0$. In this case, $M_\delta := (M_j)_{\gamma(j)=1}$. Note that $M_j$ is the j-th row of the matrix M.

That is, in FIG. 3, map $\gamma(j) = 1$ (j=1, 2, 4), and map $\gamma(j) = 0$ (j=3, 5, 6). Hence, $(M_j)_{\gamma(j)=1}$ is $M_1, M_2$, and $M_1$, and the matrix $M_\delta$.

More specifically, whether or not the j-th row of the matrix M is included in the matrix $M_\delta$ is determined by whether the value of the map γ(j) is "0" or "1".

The span program M^ accepts an input sequence δ if and only if $\vec{1} \in \text{span} \langle M_\delta \rangle$, and rejects the input sequence δ otherwise. Namely, the span program M^ accepts the input sequence δ if and only if linear combination of the rows of the matrix $M_\delta$ which are obtained from the matrix M^ by the input sequence δ gives $\vec{1}$. $\vec{1}$ is a row vector which has value "1" in each element.

For example, in FIG. 3, the span program M^ accepts the input sequence δ if and only if linear combination of the respective rows of the matrix $M_5$ consisting of the 1st, 2nd, and 4th rows of the matrix M gives $\vec{1}$. That is, if there exist $\alpha_1$, $\alpha_2$, and $\alpha_4$ with which $\alpha_1(M_1)+\alpha_2(M_2)+\alpha_4(M_4)=\vec{1}$, the span program M^ accepts the input sequence δ.

The span program is called monotone if its labels ρ are related to only positive literals $\{p_1, \ldots, p_n\}$. The span program is called non-monotone if its labels ρ are related to the literals $\{p_1, \ldots, p_n, \neg p_1, \ldots, \neg p_n\}$. Suppose that the span program is non-monotone. An access structure (non-monotone access structure) is constituted using the non-monotone span program. Briefly, an access structure controls access to encryption, namely, it controls whether a ciphertext is to be decrypted or not.

Because the span program is not monotone but non-monotone, as will be described later in detail, the application of the functional encryption scheme constituted using the span program widens.

Note that in the matrix M, $M_i \ne \vec{0}$ for each integer i=1, ..., L where $M_i$ is the i-th row of the matrix M.

<3-2. Inner-Product of Attribute Vectors and Access Structure>

Map γ(j) described above will be calculated using the inner-product of attribute vectors. Namely, which row of the matrix M is to be included in the matrix $M_\delta$ will be determined using the inner-product of the attribute vectors.

$U_t$ (t=1, ..., d and $U_t Å \{0, 1\}^*$) is a sub-universe and an attribute set. Each $U_t$ includes identification information (t) of the sub-universe and $n_t$-dimensional vector ($\vec{v}$). Namely, $U_t$ is (t, $\vec{v}$) where t∈{1, ..., d} and $\vec{v} \in F_q^{nt}$.

Let $U_t := (t, \vec{v})$ be a variable p of the span program M^:=(M, ρ), that is, p:=(t, $\vec{v}$). Let the span program M^:=(M, ρ) having the variable (p:=(t, $\vec{v}$), (t', $\vec{v'}$), ... ) be an access structure S.

That is, the access structure S:=(M, ρ), and ρ: $\{1, \ldots, L\} \to \{(t, \vec{v}), (t', \vec{v'}), \ldots, \neg(t, \vec{v}), \neg(t', \vec{v'}), \ldots\}$.

Let Γ be an attribute set, that is, $\Gamma := \{(t, \vec{x}_t) | \vec{x}_t \in F_q^{nt}, 1 \le t \le d\}$.

When Γ is given to the access structure S, map γ:{1, ..., L}→{0, 1} for the span program M^:=(M, ρ) is defined as follows. For each integer i=1, ..., L, set γ(i)=1 if [ρ(i)=(t, $\vec{v}_i$)]∧[(t, $\vec{x}_t$)∈Γ]∧[$\vec{v}_i \cdot \vec{x}_t = 0$] or [ρ(i)=¬(t, $\vec{v}_i$)]∧[(t, $\vec{x}_t$)∈Γ]∧[$\vec{v}_i \cdot \vec{x}_t \ne 0$]. Set γ(i)=0 otherwise.

Namely, the map γ is calculated based on the inner-product of the attribute vectors $\vec{v}$ and $\vec{x}$. As described above, which row of the matrix M is to be included in the matrix $M_\delta$ is determined by the map γ. More specifically, which row of the matrix M is to be included in the matrix $M_\delta$ is determined by the inner-product of the attribute vectors $\vec{v}$ and $\vec{x}$. The access structure S:=(M, ρ) accepts Γ if and only if $\vec{1} \in \text{span} \langle (M_i)_{\gamma(i)=1} \rangle$.

<3-3. Secret Distribution Scheme>

A secret distribution scheme for the access structure S:=(M, ρ) will be described.

The secret distribution scheme is distributing secret information to render it nonsense distributed information. For example, secret information s is let to be distributed among 10 lumps to generate 10 pieces of distributed information. Each of the 10 pieces of distributed information does not have information on the secret information s. Hence, even when certain one piece of distributed information is obtained, no information can be obtained on the secret information s. On the other hand, if all of the 10 pieces of distributed information are obtained, the secret information s can be recovered.

Another secret distribution scheme is also available according to which even when all of the 10 pieces of distributed information cannot be obtained, if one or more, but not all, (for example, 8 pieces) of distributed information can be obtained, then the secret information s can be recovered. A case like this where the secret information s can be recovered using 8 pieces out of 10 pieces of distributed information will be called 8-out-of-10. That is, a case where the secret information s can be recovered using t pieces out of n pieces of distributed information will be called t-out-of-n. This t will be called a threshold.

Still another secret distribution scheme is available according to which when 10 pieces of distributed information $d_1, \ldots, d_{10}$ are generated, the secret information s can be recovered if 8 pieces of distributed information $d_1, \ldots, d_8$ are given, but cannot if 8 pieces of distributed information $d_3, \ldots, d_{10}$ are given. Namely, this is a secret distribution scheme with which whether or not the secret information s can be recovered is controlled not only by the number of pieces of distributed information obtained but also depending on the combination of the distributed information.

FIG. 4 is an explanatory drawing of $s_0$. FIG. 5 is an explanatory drawing of $\vec{s}^T$.

Let a matrix M be an (L rows×r columns) matrix. Let $\vec{f}$ be a column vector indicated in Formula 120.

$$\vec{f}^T := (f_1, \ldots f_r)^T \xleftarrow{U} F_q^r \qquad \text{[Formula 120]}$$

Let $s_0$ indicated in Formula 121 be secret information to be shared.

$$s_0 := \vec{1} \cdot \vec{f}^T := \Sigma_{k=1}^r f_k \qquad \text{[Formula 121]}$$

Let $\vec{s}^T$ indicated in Formula 122 be a vector of L pieces of distributed information of $s_0$.

$$\vec{s}^T := (s_1, \ldots, s_L)^T := M \cdot \vec{f}^T \qquad \text{[Formula 122]}$$

Let the distributed information $s_i$ belong to ρ(i).

If the access structure S:=(M, ρ) accepts Γ, that is, $\vec{1} \in \text{span} \langle (M_i)_{\gamma(i)=1} \rangle$ for γ: $\{1, \ldots, L\} \to \{0, 1\}$, then there exist constants $\{\alpha_i \in F_q | i \in I\}$ such that $I \subseteq \{i \in \{1, \ldots, L\} | \gamma(i)=1\}$.

This is obvious from the explanation on FIG. 3 in that if there exist $\alpha_1$, $\alpha_2$, and $\alpha_4$ with which $\alpha_1(M_1)+\alpha_2(M_2)+\alpha_4(M_4)=\vec{1}$, the span program M^ accepts the input sequence δ. Namely, if the span program M^ accepts the input sequence δ when there exist $\alpha_1$, $\alpha_2$, and $\alpha_4$ with which $\alpha_1(M_1)+\alpha_2(M_2)+\alpha_4(M_4)=\vec{1}$, then there exist $\alpha_1$, $\alpha_2$, and $\alpha_4$ with which $\alpha_1(M_1)+\alpha_2(M_2)+\alpha_4(M_4)=\vec{1}$.

Note Formula 123.

$$\Sigma_{i \in I} \alpha_i s_i = s_0 \qquad \text{[Formula 123]}$$

Note that the constants $\{\alpha_i\}$ can be computed in time polynomial in the size of the matrix M.

With the functional encryption scheme according to this and the following embodiments, an access structure is constructed by applying the inner-product predicate and the secret distribution scheme to the span program, as described above. Therefore, access control can be designed flexibly by designing the matrix M in the span program and the attribute information x and the attribute information v (predicate information) in the inner-product predicate. Namely, access control can be designed very flexibly. Designing of the matrix M corresponds to designing conditions such as the threshold of the secret distribution scheme.

For example, the attribute-based encryption scheme corresponds to a case, in the access structure in the functional encryption scheme according to this embodiment, where designing of the inner-product predicate is limited to a certain condition. That is, when compared to the access structure in the functional encryption scheme according to this embodiment, the access structure in the attribute-based encryption scheme has a lower flexibility in access control design because it lacks the flexibility in designing the attribute information x and the attribute information v (predicate information) in the inner-product predicate. More specifically, the attribute-based encryption scheme corresponds to a case where attribute information $\{\vec{x}_t\}_{t\in\{1,\ldots,d\}}$ and $\{\vec{v}_t\}_{t\in\{1,\ldots,d\}}$ are limited to two-dimensional vectors for the equality relation, for example, $\vec{x}_t:=(1, x_t)$ and $\vec{v}_t:=(v_t, -1)$.

In particular, the access structure in the functional encryption scheme according to this and the following embodiments constitutes a non-monotone access structure that uses a non-monotone span program. Thus, the flexibility in access control designing improves.

More specifically, since the non-monotone span program includes a negative literal ($\neg p$), a negative condition can be set. For example, assume that First Company includes four departments of A, B, C, and D. Assume that access control is to be performed that only the users belonging to departments other than B department of First Company are capable of access (capable of decryption). In this case, if a negative condition cannot be set, a condition that "the user belongs to any one of A, C, and D departments of First Company" must be set. On the other hand, if a negative condition can be set, a condition that "the user is an employee of First Company and belongs to a department other than department B" can be set. Namely, since a negative condition can be set, natural condition setting is possible. Although the number of departments is small in this case, this scheme is very effective in a case where the number of departments is large.

<4. Basic Structure of Decentralized Multi-Authority Functional Encryption>

<4-1. Basic Structure of Decentralized Multi-Authority Functional Encryption>

The structure of a decentralized multi-authority functional encryption will be briefly described.

The decentralized multi-authority functional encryption scheme consists of five algorithms: GSetup, ASetup, AttrGen, Enc, and Dec.

(GSetup)

A GSetup algorithm is a randomized algorithm that takes as input a security parameter $\lambda$ and outputs a global public parameter gparam. The GSetup algorithm is executed by one certain party. The global public parameter gparam is publicized.

(ASetup)

An ASetup algorithm is a randomized algorithm that takes as input the global public parameter gparam, authority identification information t, and an attribute format $\vec{n}$, and outputs an authority public key $apk_t$ and an authority secret key $ask_t$. The ASetup algorithm is executed by an authority t having as identification information at least one t that satisfies $1 \le t \le d$. The authority public key $apk_t$ is publicized, and the authority secret key $ask_s$ is possessed by the authority t.

(AttrGen)

An AttrGen algorithm is a randomized algorithm that takes as input the global public parameter gparam, the authority identification information t, the authority secret key $ask_t$, user identification information gid, and an attribute $\vec{x}_t:=(x_{t,i})$ ($i=1,\ldots,n_t$)$\in F_q$, and outputs a decryption key $usk_{gid,(t,xt)}$. The AttrGen algorithm is executed by the authority t when the authority t generates a decryption key related to the attribute $\vec{x}_t$ to the user indicated by the identification information gid. The authority t gives the decryption key $usk_{gid,(t,xt)}$ to the user indicated by the identification information gid.

(Enc)

An Enc algorithm is a randomized algorithm that takes as input the global public parameter gparam, the authority public key $apk_t$, a message $m \in G_T$, and an access structure S, and outputs a ciphertext $ct_s$. The Enc algorithm is executed by a user who generates the ciphertext $ct_s$.

(Dec)

A Dec algorithm is an algorithm that takes as input the global public parameter gparam, the authority public parameter $apk_t$, the decryption key $usk_{gid,(t,xt)}$, and the ciphertext $ct_s$, and outputs either the message m or distinguished symbol $\perp$. The Dec algorithm is executed by a user who decrypts the ciphertext $ct_s$.

<4-2 Cryptographic Processing System 10>

The cryptographic processing system 10 that executes the algorithms of the decentralized multi-authority functional encryption described above will be described.

Figure 6:
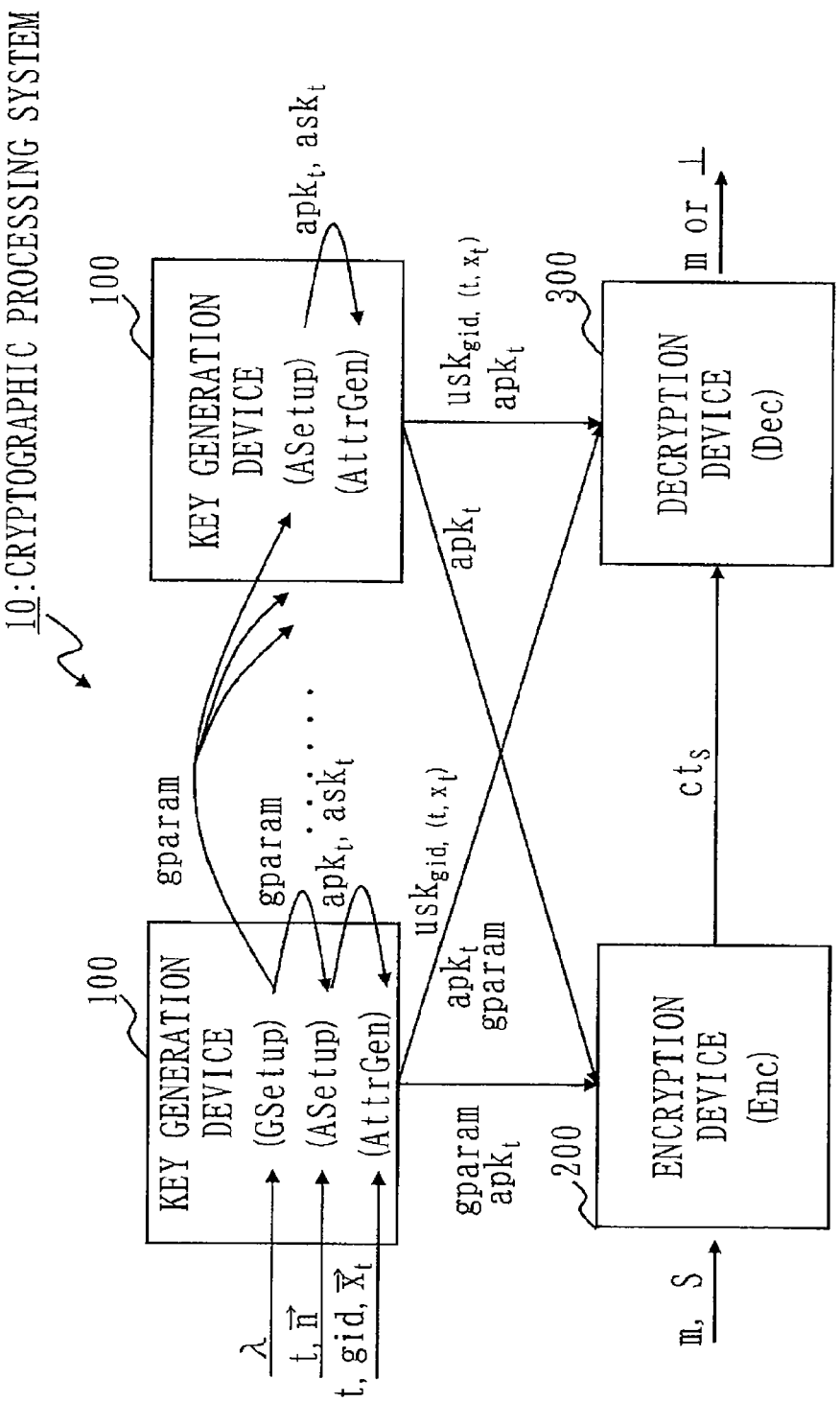
FIG. 6 is a configuration diagram of a cryptographic processing system 10 which executes decentralized multi-authority functional encryption.

FIG. 6 is a configuration diagram of the cryptographic processing system 10 which executes the decentralized multi-authority functional encryption.

One (single) key generation device 100 executes the GSetup algorithm by taking as input the security parameter $\lambda$, and generates the global public parameter gparam. This key generation device 100 publicizes the generated global public parameter gparam.

Each key generation device 100 executes the ASetup algorithm by taking as input the global public parameter gparam, the identification information t assigned to this key generation device 100, and the attribute format $\vec{n}$, and generates the authority public key $apk_t$ and the authority secret key $ask_t$.

Each key generation device 100 executes the AttrGen algorithm by taking as input global the public parameter gparam, the identification information t assigned to this key generation device 100, the authority secret key $ask_t$, the user identification information gid, and the attribute $\vec{x}_t:=(x_{t,i})$($i=1,\ldots,n_t$)$\in F_q$, and generates the decryption key $usk_{gid,(t,xt)}$ and distributes it to the decryption device 300 in secrecy.

The encryption device 200 executes the Enc algorithm by taking as input the global public parameter gparam, the authority public key $apk_t$, the message $m \in G_T$, and the access structure S, and generates the ciphertext $ct_s$. The encryption device 200 transmits the generated ciphertext $ct_s$ to the decryption device 300.

The decryption device 300 executes the Dec algorithm by taking as input the global public parameter gparam, the authority public key $apk_t$, the decryption key $usk_{gid,(t,xt)}$, and the ciphertext $ct_s$, and outputs either the message m or distinguished symbol $\perp$.

<4-3. Decentralized Multi-Authority Functional Encryption and Cryptographic Processing System 10 in Detail>

The decentralized multi-authority functional encryption according to Embodiment 1, and the function and operation of the cryptographic processing system 10 which executes the decentralized multi-authority functional encryption will be described with reference to FIGS. 7 to 14.

Figure 7:
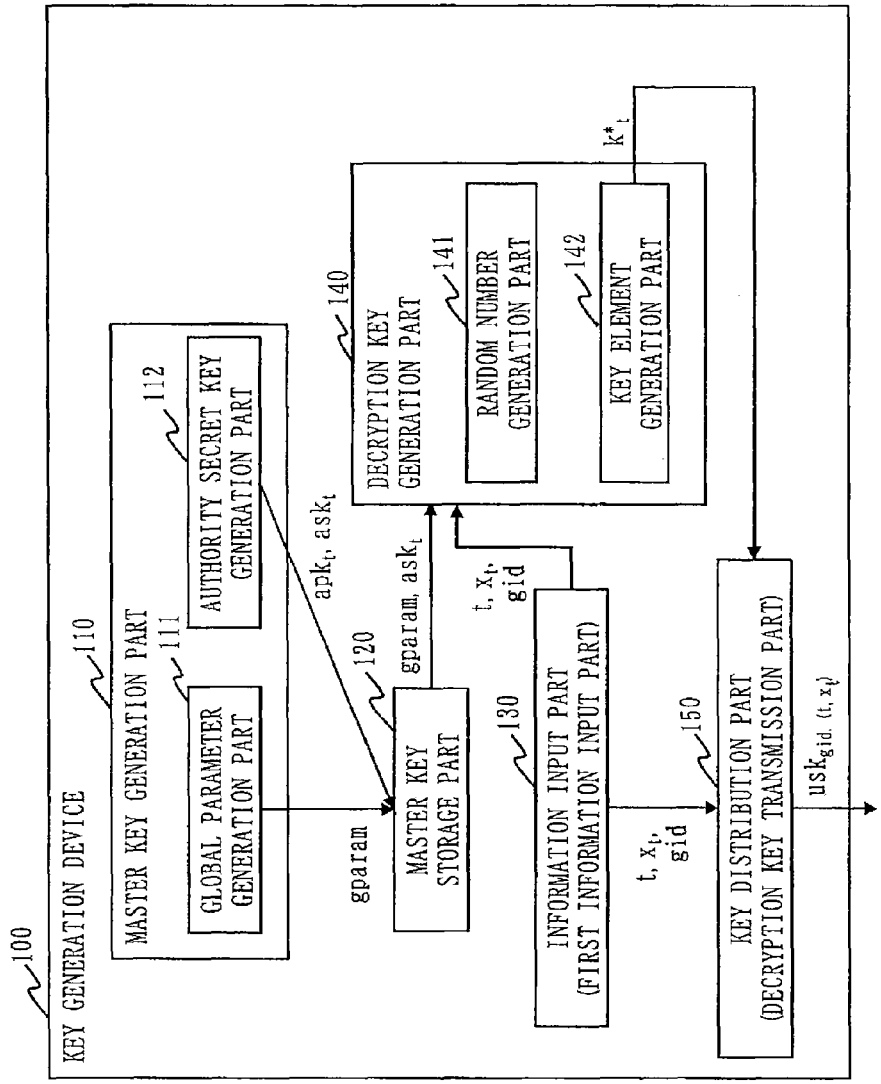
FIG. 7 is a function block diagram showing a function of a key generation device 100.
Figure 8:
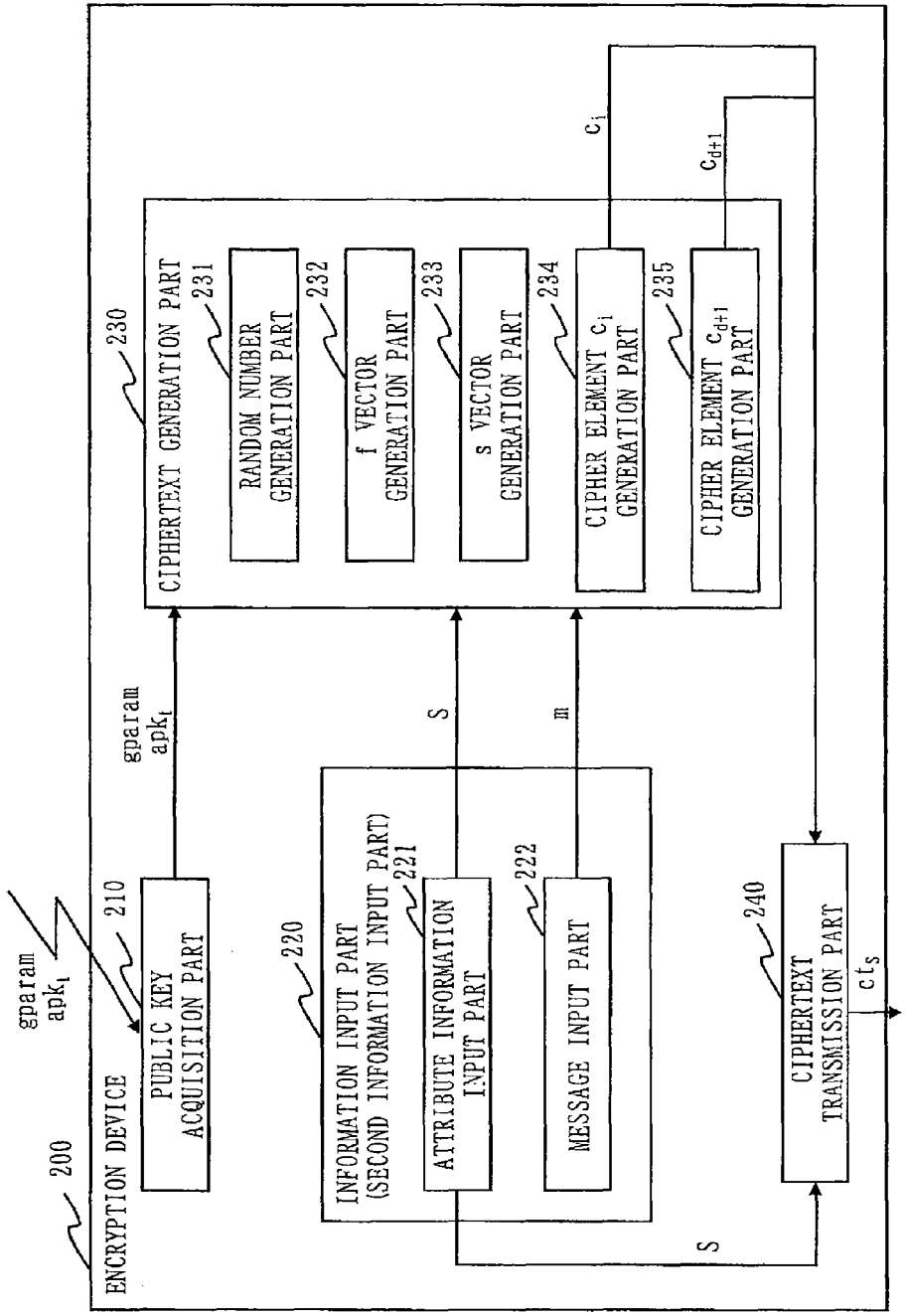
FIG. 8 is a function block diagram showing a function of an encryption device 200.
Figure 9:
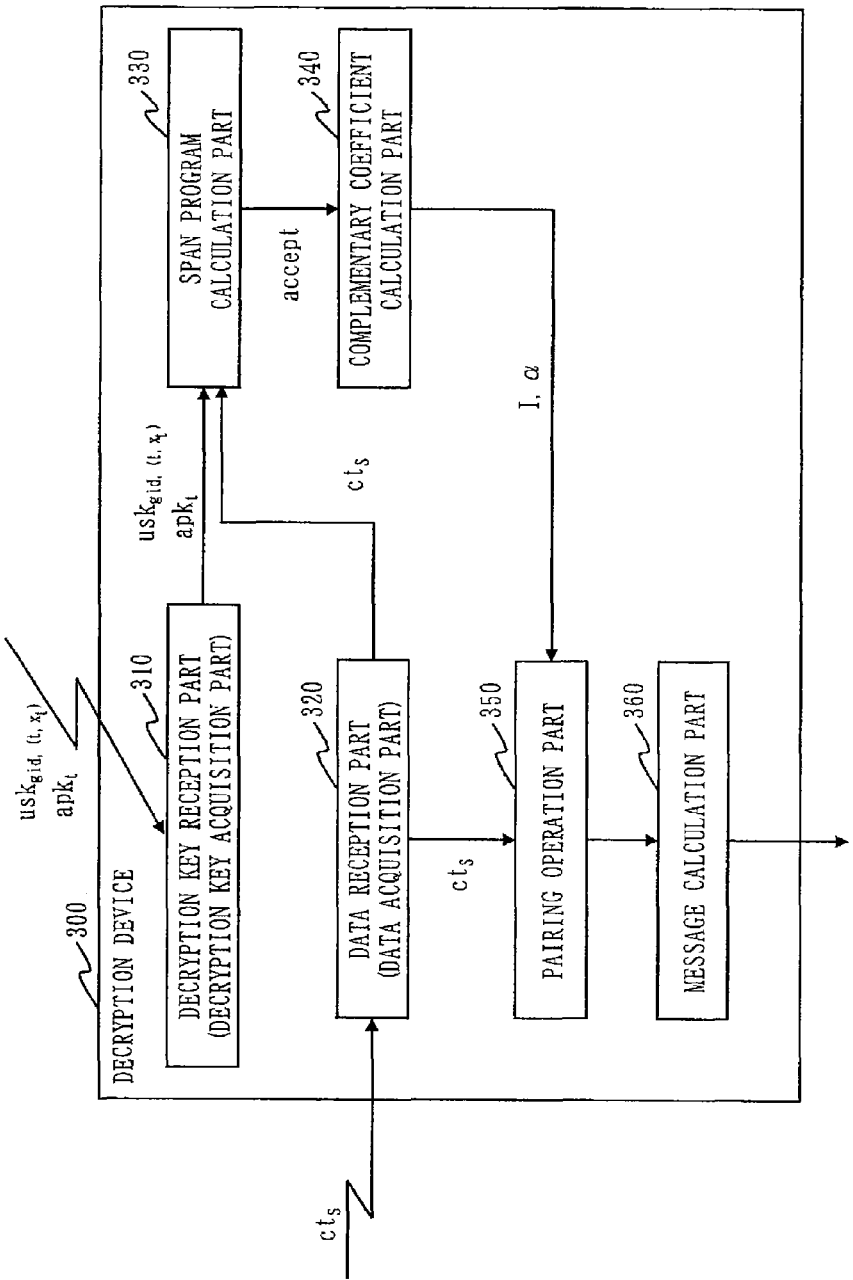
FIG. 9 is a function block diagram showing a function of a decryption device 300.

FIG. 7 is a function block diagram showing the function of the key generation device 100. FIG. 8 is a function block diagram showing the function of the encryption device 200. FIG. 9 is a function block diagram showing the function of the decryption device 300.

Figure 10:
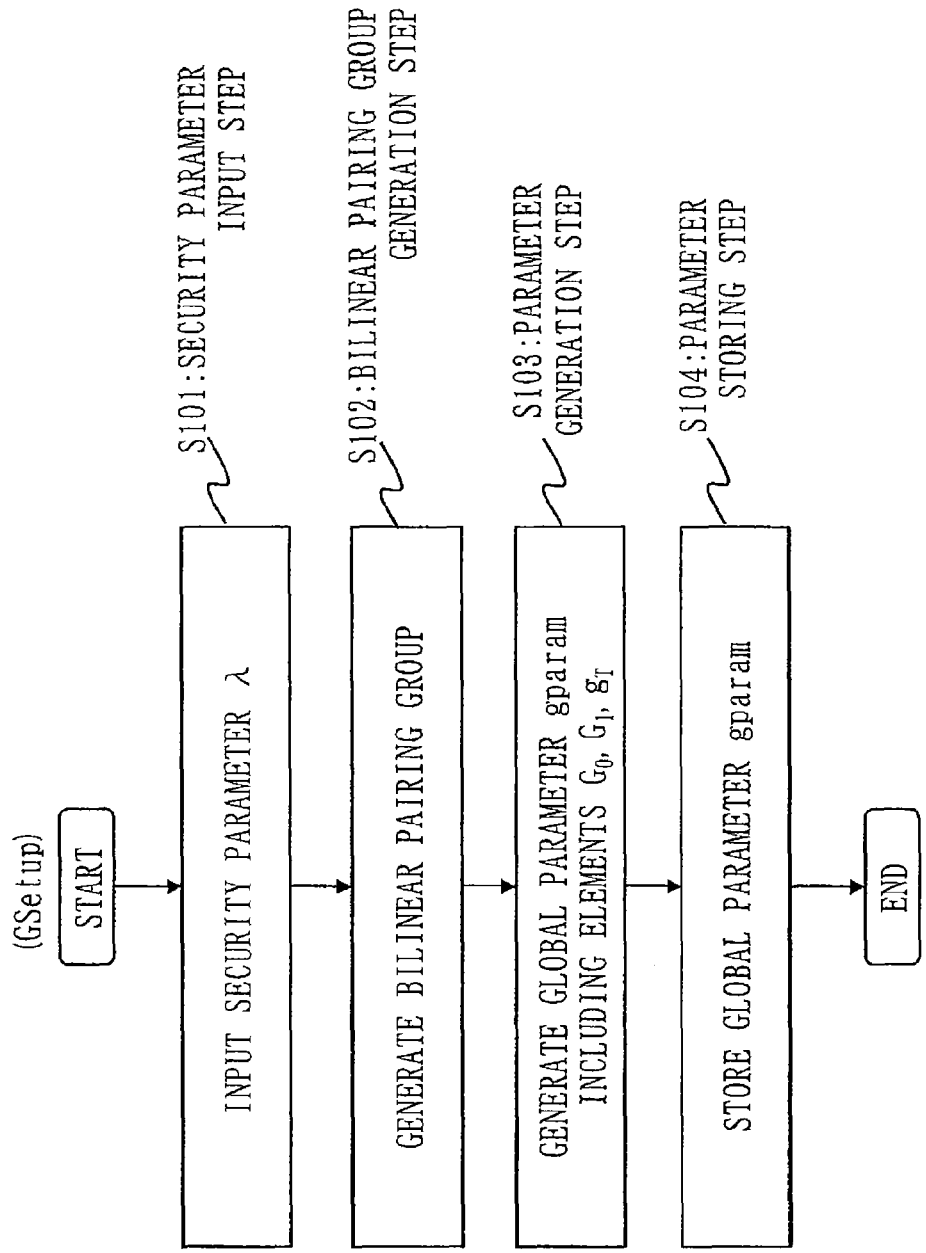
FIG. 10 is a flowchart showing the process of GSetup algorithm.
Figure 11:
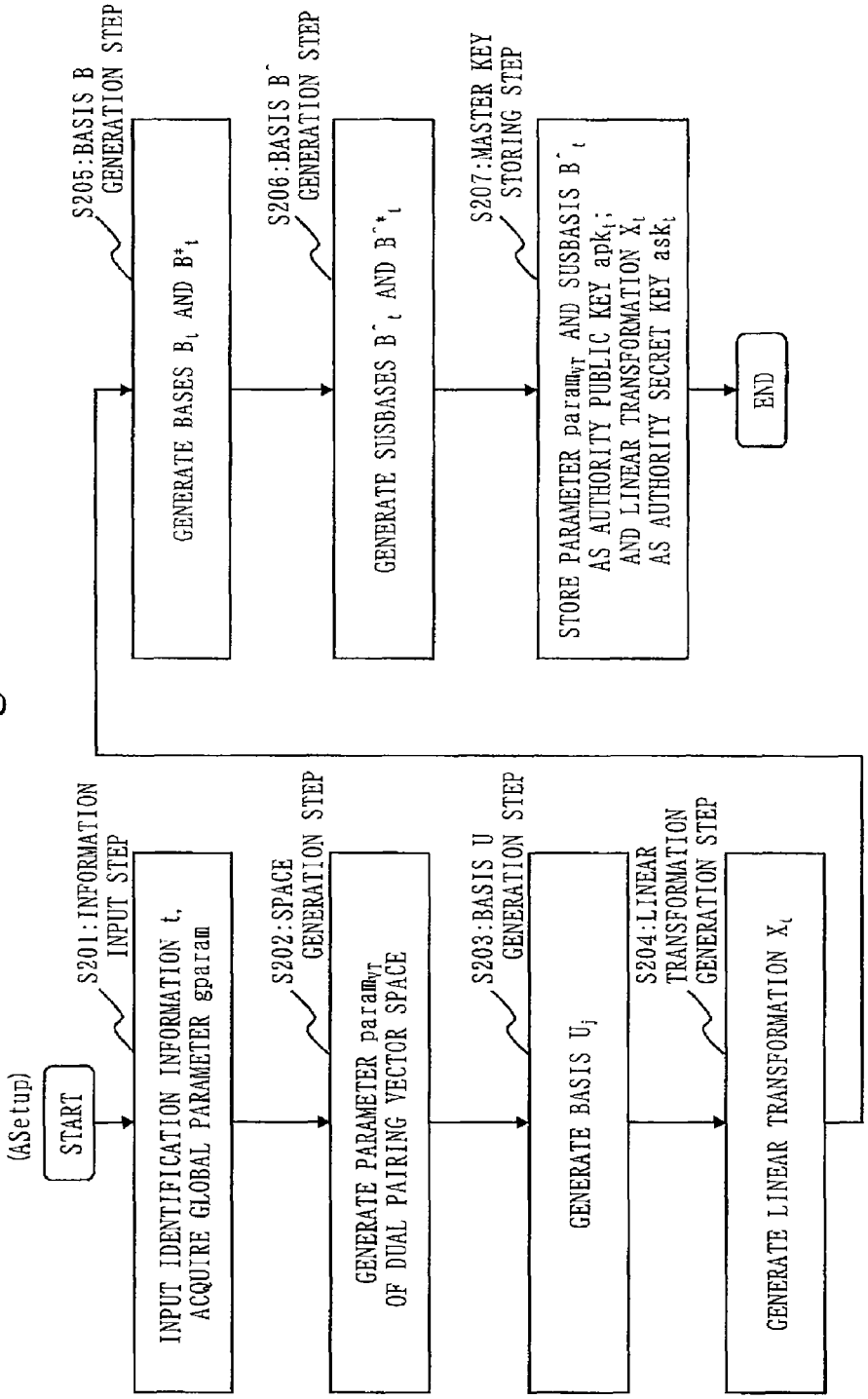
FIG. 11 is a flowchart showing the process of ASetup algorithm.
Figure 12:
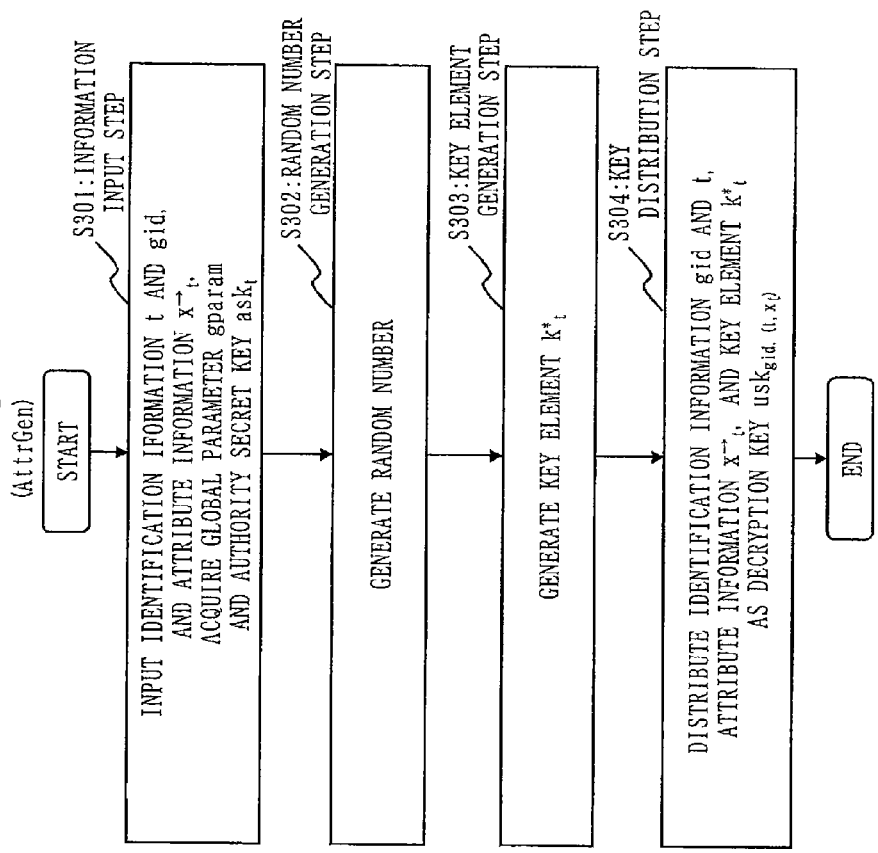
FIG. 12 is a flowchart showing the process of AttrGen algorithm.
Figure 13:
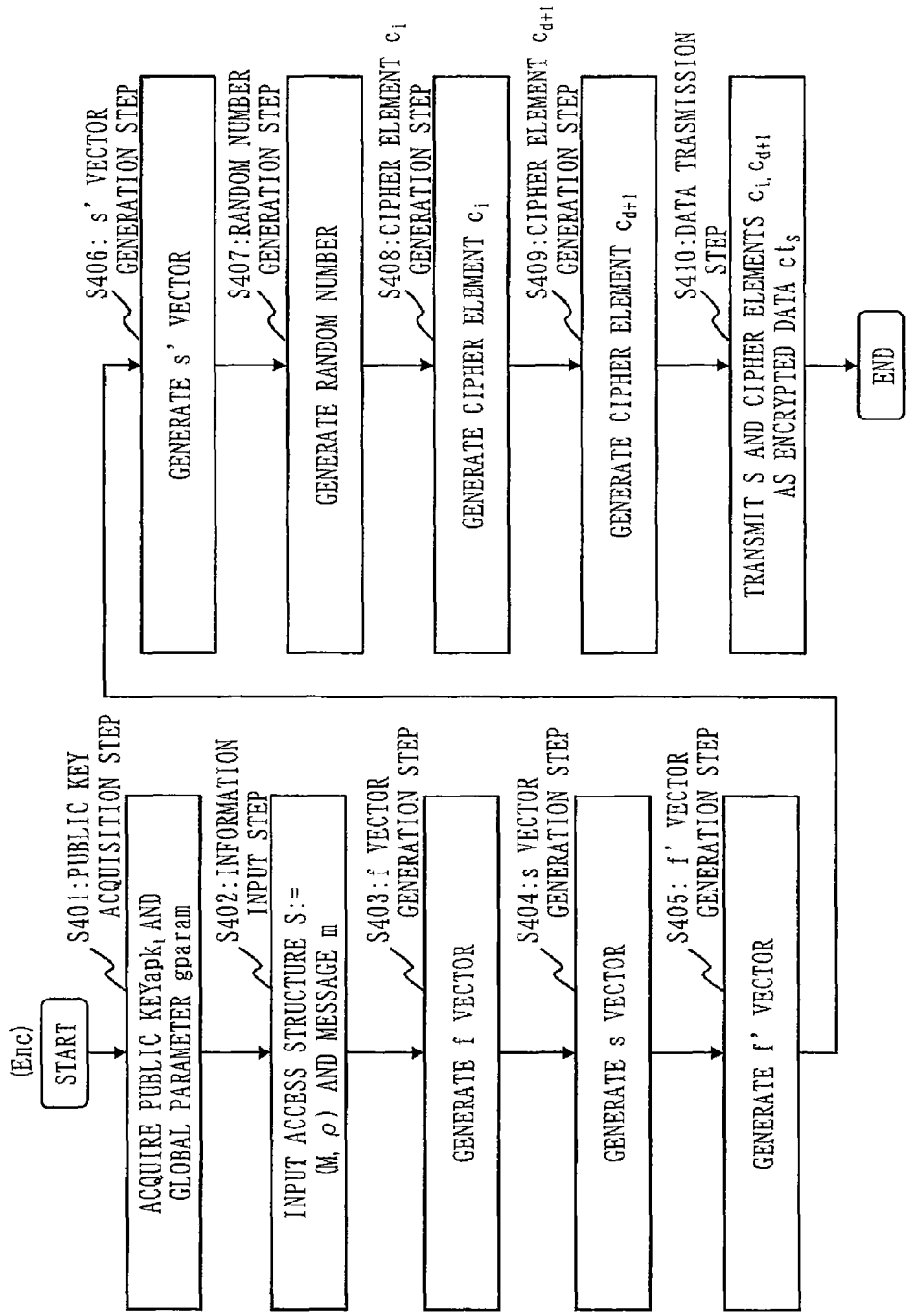
FIG. 13 is a flowchart showing the process of Enc algorithm.

FIGS. 10 to 12 are flowcharts showing the operation of the key generation device 100. Note that FIG. 10 is a flowchart showing the process of the GSetup algorithm, that FIG. 11 is a flowchart showing the process of the ASetup algorithm, and that FIG. 12 is a flowchart showing the process of the AttrGen algorithm. FIG. 13 is a flowchart showing the operation of the encryption device 200 and the process of the Enc algorithm. FIG. 14 is a flowchart showing the operation of the decryption device 300 and the process of the Dec algorithm.

The function and operation of the key generation device 100 will be described.

As shown in FIG. 7, the key generation device 100 is provided with a master key generation part 110, a master key storage part 120, an information input part 130 (first information input part), a decryption key generation part 140, and a key distribution part 150 (decryption key transmission part).

The master key generation part 110 is provided with a global parameter generation part 111 and an authority secret key generation part 112. The decryption key generation part 140 is provided with a random number generation part 141 and a key element generation part 145.

The process of the GSetup algorithm executed by the key generation device 100 will be described first with reference to FIG. 10. As described above, the GSetup algorithm may be executed by one key generation device 100 out of the plurality of key generation devices 100.

(S101: Security Parameter Input Step)
With the input device, the global parameter generation part 111 takes as input a security parameter $\lambda$ ($1^\lambda$).

(S102: Bilinear Pairing Group Generation Step)
With the processing device, the global parameter generation part 111 executes algorithm $G_{bpg}$ by taking as input the security parameter $\lambda$ ($1^\lambda$) inputted in S101, and randomly generates the values of a parameter $param_G := (q, G, G_T, g, e)$ of the bilinear pairing group.

(S103: Parameter Generation Step)
A hash function H is determined as a hash function indicated in Formula 124.

$$H: \{0,1\}^* \to \mathbb{G} \quad \text{[Formula 124]}$$

With the processing device, the global parameter generation part 111 generates elements $G_0$ and $G_1$ of the global parameter gparam indicated in Formula 125.

$$G_0 := H(0^\lambda) \in \mathbb{G},$$

$$G_1 := H(1^\lambda) \in \mathbb{G} \quad \text{[Formula 125]}$$

The global parameter generation part 111 also sets $g_T := e(G_0, G_1)$.

(S104: Parameter Storing Step)
The master key storage part 120 stores $param_G$ generated in (S102), and the hash function H, the elements $G_0$, $G_1$, and the value $g_T$ which are set in (S103), as the global parameter gparam in the storage device.

In brief, from (S101) through (S103), the key generation device 100 generates the global parameter gparam by executing the GSetup algorithm indicated in Formula 126. Then, in (S104), the key generation device 100 stores the generated public global parameter gparam, in the storage device.

Note that the global parameter gparam is publicized via, e.g., a network, so that other key generation devices 100, the encryption device 200, and the decryption device 300 can acquire it.

[Formula 126]

$$\text{GSetup}(1^\lambda): \text{param}_\mathbb{G} := (q, \mathbb{G}, \mathbb{G}_T, g, e) \xleftarrow{R} \mathcal{G}_{bpg}(1^\lambda),$$

$$H: \{0,1\}^* \to \mathbb{G}; \quad G_0 := H(0^\lambda) \in \mathbb{G}, G_1 := H(1^\lambda) \in \mathbb{G}, g_T := e(G_0, G_1),$$

$$\text{return gparam} := (\text{param}_\mathbb{G}, H, G_0, G_1, g_T).$$

The process of the ASetup algorithm executed by the key generation device 100 will be described with reference to FIG. 11. As described above, the ASetup algorithm may be executed by all of the plurality of key generation devices 100, or only some of the plurality of key generation devices 100.

(S201: Information Input Step)
With the input device, the information input part 130 takes as input the identification information t assigned to itself (its key generation device 100). Note that different identification information t are assigned to the respective key generation devices 100.

For example, with the communication device, the information input part 130 acquires the global parameter gparam via the network. If this information input part 130 belongs to the key generation device 100 that has generated the global parameter gparam, the information input part 130 may read the global parameter gparam from the master key generation part 120.

(S202: Space Generation Step)
With the processing device, the authority secret key generation part 112 executes the algorithm $G_{dpvs}$ by taking as input the security parameter $\lambda$ ($1^\lambda$), $N_t = 2n_t + u_t + w_t + z_1$, and the values of $param_G := (q, G, G_T, g, e)$, to generate the values of a parameter $param_{V_t} := (q, V_t, G_T, A_t, e)$ of the dual pairing vector spaces.

Note that $n_t$, $u_t$, $w_t$, and $z_t$ are each an integer of 1 or more.

(S203) Basis U Generation Step
With the processing device, the authority secret key generation part 112 generates a basis $U_j$ for each integer $j=0, 1$, as indicated in Formula 127.

[Formula 127]

$$\mathbb{U}_j := (u_{j,1}, \ldots, u_{j,N_t}),$$

$$\text{where } u_{j,i} := (\overbrace{0, \ldots, 0}^{i-1}, G_j, \overbrace{0, \ldots, 0}^{N_t-i})$$

$$\text{for } j = 0, 1; i = 1, \ldots, N_t$$

(S204: Linear Transformation Generation Step)
With the processing device, the authority secret key generation part 112 takes as input $N_t$ and $F_q$, and generates linear transformation $X_t := (\chi_{t,i,j})_{i,j}$ randomly, as indicated in Formula 128.

[Formula 128]

$$X_t \xleftarrow{U} GL(N_t, \mathbb{F}_q)$$

Note that GL stands for General Linear. Namely, GL is a general linear group, a set of square matrices in which the determinant is not 0, and a group with respect to multiplication. Note that $(\chi_{t,i,j})_{i,j}$ signifies a matrix concerning the suffixes i and j of the matrix $\chi_{t,i,j}$, where i, j=1, . . . , $N_t$.

(S605: Basis B Generation Step)

With the processing device, the authority secret key generation part 112 generates a basis $\mathbb{B}_t$ and a basis $\mathbb{B}^*_t$, as indicated in Formula 129.

$$(\mathbb{B}_t, \mathbb{B}^*_t := (X_t(\mathbb{U}_0), (X_t^T)^{-1}(\mathbb{U}_1)) \quad \text{[Formula 129]}$$

(S206: Basis B^ Generation Step)

With the processing device, the authority secret key generation part 112 generates a subbasis $\hat{\mathbb{B}}_t$ of the basis $\mathbb{B}_t$ and a subbasis $\hat{\mathbb{B}}^*_t$ of the basis $\mathbb{B}^*_t$ as indicated in Formula 130.

$$\hat{\mathbb{B}}_t := (b_{t,1}, \ldots, b_{t,2n_t}, b_{t,2n_t+u_t+w_t+1}, \ldots, b_{t,2n_t+u_t+w_t+z_t}),$$

$$\hat{\mathbb{B}}^*_t := (b^*_{t,1}, \ldots, b^*_{t,2n_t}, b^*_{t,2n_t+u_t+1}, \ldots, b^*_{t,2n_t+u_t+w_t}) \quad \text{[Formula 130]}$$

(S207: Master Key Storing Step)

The master key storage part 120 stores the parameter $\text{param}_{\mathbb{V}_t}$ generated in (S202), and the subbasis $\hat{\mathbb{B}}^*_t$ generated in (S206), in the storage device as an authority public key $apk_t$. The master key storage part 120 also stores the linear transformation $X_t$ generated in (S204), in the storage device as the authority secret key $ask_t$.

In brief, from (S201) through (S206), the key generation device 100 generates the authority public parameter $apk_t$ and the authority secret key $ask_t$ by executing the ASetup algorithm indicated in Formula 131. Then, in (S207), the key generation device 100 stores the generated authority public parameter $apk_t$ and authority secret key $ask_t$, in the storage device.

Note that the authority public parameter $apk_t$ is publicized via, e.g., a network, so that the encryption device 200 and decryption device 300 can acquire it.

[Formula 131]

ASetup(gparam, $t$, $n_t$, $u_t$, $w_t$, $z_t$):

$N_t := 2n_t + u_t + w_t + z_t$, $\text{param}_{\mathbb{V}_t} := (q, \mathbb{V}_t, \mathbb{G}_T, \mathbb{A}_t, e) := \mathcal{G}_{dpvs}(1^\lambda, N_t, \text{param}_{\mathbb{G}})$, $\mathbb{U}_j := (u_{j,1}, \ldots, u_{j,N_t})$, where $u_{j,i} := (\overbrace{0, \ldots, 0}^{i-1}, G_j, \overbrace{0, \ldots, 0}^{N_t-i})$ for $j = 0, 1; i = 1, \ldots, N_t$, $X_t \xleftarrow{U} GL(N_t, \mathbb{F}_q), (\mathbb{B}_t, \mathbb{B}^*_t) := (X_t(\mathbb{U}_0), (X_t^T)^{-1}(\mathbb{U}_1)),$ $\hat{\mathbb{B}}_t := (b_{t,1}, \ldots, b_{t,2n_t}, b_{t,2n_t+u_t+w_t+1}, \ldots, b_{t,2n_t+u_t+w_t+z_t}),$ $\hat{\mathbb{B}}^*_t := (b^*_{t,1}, \ldots, b^*_{t,2n_t}, b^*_{t,2n_t+u_t+1}, \ldots, b^*_{t,2n_t+u_t+w_t}),$ $ask_t := X_t, apk_t := (\text{param}_{\mathbb{V}_t}, \hat{\mathbb{B}}_t),$ return $(ask_t, apk_t)$.

The process of the AttrGen algorithm executed by the key generation device 100 will be described with reference to FIG. 12. Note that, as described above, the AttrGen algorithm is executed by the key generation device 100, among the plurality of key generation devices 100, that has executed the ASetup algorithm.

(S301: Information Input Step)

With the input device, the information input part 130 takes as input the identification information t assigned to itself (its key generation device 100), the identification information gid of the user to whom the decryption key is to be issued, and the attribute information $\vec{x}_t := (x_{t,i})$ (i=1, . . . , $n_t$) indicated in Formula 132.

For example, with the communication device, the information input part 130 also acquires the global parameter gparam via the network. If this information input part 130 belongs to the key generation device 100 that has generated the global parameter gparam, the information input part 130 may read the global parameter gparam from the master key storage part 120.

The information input part 130 also reads the authority secret key $ask_t$ from the master key storage part 120.

$$\vec{x}_t := x_{t,1}, \ldots, x_{t,n_t} \in \mathbb{F}_q^{n_t} - \{\vec{0}\} \text{ such that } x_{t,1} := 1 \quad \text{[Formula 132]}$$

(S302: Random Number Generation Step)

With the processing device, the random number generation part 141 generates a random number $\vec{\phi}_t$ for the identification information t, as indicated in Formula 133.

[Formula 133]

$$\vec{\phi}_t := (\phi_{t,1}, \ldots, \phi_{t,w_t}) \xleftarrow{U} \mathbb{F}_q^{w_t}$$

(S303: Key Element Generation Step)

Assume that Formula 134 is established.

$$G_{gid}(=\delta G_1) := H(gid) \in \mathbb{G} \quad \text{[Formula 134]}$$

With the processing device, the key element generation part 142 generates a key element $k^*_t$ which is an element of the decryption key $usk_{gid,(t,xt)}$, for the identification information t, as indicated in Formula 135.

$$k^*_t := \quad \text{[Formula 135]}$$

$(X_t^T)^{-1}((x_{t,1}(G_{gid} + G_1), \ldots, x_{t,n_t}(G_{gid} + G_1), -x_{t,1}G_{gid},$ $\ldots, -x_{t,n_t}G_{gid}, 0^{u_t}, \phi_{t,1}G_1, \ldots, \phi_{t,w_t}G_1, 0^{z_t})),$ i.e., $k^*_t = ((\delta+1)\vec{x}_t, \overbrace{-\delta\vec{x}_t}^{n_t}, \overbrace{0^{u_t}}^{u_t}, \overbrace{\vec{\phi}_t}^{w_t}, \overbrace{0^{z_t}}^{z_t})_{\mathbb{B}^*_t}$ As described above, for the bases B and B* indicated in Formula 110, Formula 111 is established. Hence, Formula 135 means that the coefficient for the basis vector of a basis $\mathbb{B}^*_t$ is set as described below. For the purpose of simple representation, a basis vector $b^*_{t,i}$ is specified only by its i portion. For example, a basis vector 1 signifies a basis vector $b^*_{t,1}$. Basis vectors 1, . . . , 3 signify basis vectors $b^*_{t,1}$, . . . , $b^*_{t,3}$, respectively.

$(\delta+1)x_{t,1}, \ldots, (\delta+1)x_{t,nt}$ (where nt represents $n_t$) are each set as the coefficient for the basis vectors 1, . . . , $n_t$. $-\delta x_{t,1}, \ldots, -\delta x_{t,nt}$ (where nt represents $n_t$) are each set as the coefficient for the basis vectors $n_t+1, \ldots, 2n_t$. 0 is set as the coefficient for basis vectors $2n_t+1, \ldots, 2n_t+u_t$. Random numbers $\phi_{t,i}, \ldots, \phi_{t,wt}$ (where wt represents $w_t$) are each set as the coefficient for basis vectors $2n_t+u_t+1, \ldots, 2n_t+u_t+w_t$. 0 is set as the coefficient for basis vectors $2n_t+u_t+w_t+1, \ldots, 2n_t+u_t+w_t+z_t$.

(S304: Key Distribution Step)

For example, with the communication device, the key distribution part 150 distributes the decryption key $usk_{gid,(t,xt)}$, constituted as elements by the user identification information gid, the identification information t and the attribute information $\vec{x}_t$, and the key element $k^*_t$, to the decryption device 300 in secrecy via the network. As a matter of course, the decryption key $usk_{gid,(t,xt)}$ may be distributed to the decryption device 300 by another method.

In brief, from (S301) through (S303), the key generation device 100 generates the decryption key $usk_{gid,(t,xt)}$ by executing the AttrGen algorithm indicated in Formula 136. In (S304), the key generation device 100 distributes the generated decryption key $usk_{gid,(t,xt)}$ to the decryption device 300.

$$\text{AttrGen}(gparam, t, ask_t, gid, \vec{x}_t := (x_{t,1},...,x_{t,n_t}) \quad \text{[Formula 136]}$$

$$\in \mathbb{F}_q^{n_t} - \{\vec{0}\} \text{ such that } x_{t,1} := 1):$$

$$G_{gid}(=\delta G_1) := H(gid) \in \mathbb{G}, \varphi_t = (\varphi_{t,1},\ldots,\varphi_{t,w_t}) \xleftarrow{U} \mathbb{F}_q^{w_t},$$

$$k_t^* := (X_t^T)^{-1}((x_{t,1}(G_{gid}+G_1),\ldots,x_{t,n_t}(G_{gid}+G_1), -x_{t,1}G_{gid},\ldots,$$

$$-x_{t,n_t}G_{gid}, 0^{u_t}, \varphi_{t,1}G_1, \ldots, \varphi_{t,w_t}G_1, 0^{z_t})),$$

i.e., $k_t^* = (\underbrace{(\delta+1)\vec{x}_t}_{n_t}, \underbrace{-\delta\vec{x}_t}_{n_t}, \underbrace{0^{u_t}}_{u_t}, \underbrace{\vec{\varphi}_t}_{w_t}, \underbrace{0^{z_t}}_{z_t})_{\mathbb{B}_t^*}$ return $usk_{gid,(t,x_t)} := (gid,(t,\vec{x}_t),k_t^*)$.

The function and operation of the encryption device 200 will be described.

As shown in FIG. 8, the encryption device 200 is provided with a public key acquisition part 210, an information input part 220 (second information input part), a ciphertext generation part 230, and a ciphertext transmission part 240.

The information input part 220 is provided with an attribute information input part 221 and a message input part 222. The ciphertext generation part 230 is provided with a random number generation part 231, an f vector generation part 232, an s vector generation part 233, a cipher element $c_i$ generation part 234, and a cipher element $c_{d+1}$ generation part 235.

The process of the Enc algorithm executed by the encryption device 200 will be described with reference to FIG. 13.

(S401: Public Key Acquisition Step)

For example, with the communication device, the public key acquisition part 210 acquires the authority public key $apk_t$ generated by each key generation device 100, via the network. The public key acquisition part 210 also acquires the global parameter gparam generated by the key generation device 100.

(S402: Information Input Step)

With the input device, the attribute information input part 221 takes as input the access structure $S := (M, \rho)$. The matrix M is a matrix of L rows×r columns. L and r are each an integer of 1 or more.

With the input device, the message input part 220 takes as input the message m to be encrypted.

The access structure S is to be set depending on the condition of the system to be implemented.

(S403: f Vector Generation Step)

With the processing device, the f vector generation part 232 generates a vector $\vec{f}$ having r pieces of elements, randomly as indicated in Formula 137.

$$\vec{f} \xleftarrow{U} \mathbb{F}_q^r \quad \text{[Formula 137]}$$

(S404: s Vector Generation Step)

With the processing device, the s vector generation part 233 generates a vector $\vec{s}^T$, based on the (L rows×r columns) matrix M of the access structure S inputted in (S402) and the vector $\vec{f}$ generated in (S403) and having r pieces of elements, as indicated in Formula 138.

$$\vec{s}^T := (s_1,\ldots,s_L)^T := M \cdot \vec{f}^T \quad \text{[Formula 138]}$$

With the processing device, the s vector generation part 233 generates a value $s_0$, based on the vector $\vec{f}$ generated in (S403), as indicated in Formula 139. Note that $\vec{1}$ is a vector which has a value 1 in all its elements.

$$s_0 = \vec{1} \cdot \vec{f}^T \quad \text{[Formula 139]}$$

(S405: f' Vector Generation Step)

With the processing device, the f vector generation part 232 generates a vector $\vec{f}'$ having r pieces of elements, randomly as indicated in Formula 140 under the condition of $s_0 = \vec{1} \cdot \vec{f}'^T$.

$$\vec{f}' \xleftarrow{R} \mathbb{F}_q^r \text{ s.t. } s_0 = \vec{1} \cdot \vec{f}'^T \quad \text{[Formula 140]}$$

(S406: s' Vector Generation Step)

With the processing device, the s vector generation part 233 generates a vector $(\vec{s}')^T$, based on the (L rows×r columns) matrix M of the access structure S inputted in (S402) and the vector $\vec{f}'$ having r pieces of elements, as indicated in Formula 141.

$$\vec{s}'^T := (s'_1,\ldots,s'_L)^T := M \cdot \vec{f}'^T \quad \text{[Formula 141]}$$

(S407: Random Number Generation Step)

With the processing device, the random number generation part 231 generates random numbers $\vec{\eta}_i$, $\theta_i$, and $\theta'_i$, for each integer i=1, ..., L, as indicated in Formula 142.

$$\vec{\eta}_i := (\eta_{i,1},\ldots,\eta_{i,z_t}) \xleftarrow{U} \mathbb{F}_q^{z_t} \quad (i=1,\ldots,L),$$

$$\theta_i, \theta'_i \xleftarrow{U} \mathbb{F}_q \quad (i=1,\ldots,L) \quad \text{[Formula 142]}$$

(S408: Cipher Element $c_i$ Generation Step)

With the processing device, the cipher element generation part 234 generates the cipher element $c_i$ which is an element of the ciphertext $ct_s$, for each integer i=1, ..., L, as indicated in Formula 143.

for $i=1,\ldots,L$, [Formula 143]

if $\rho(i) = (t, \vec{v}_i := (v_{i,1},\ldots,v_{i,n_t}) \in \mathbb{F}_q^{n_t} - \{\vec{0}\}$ such that $v_{i,n_t} \neq 0$), $$c_i := (\underbrace{s_i \vec{e}_{t,1} + \theta_i \vec{v}_i}_{n_t}, \underbrace{s'_i \vec{e}_{t,1} + \theta'_i \vec{v}_i}_{n_t}, \underbrace{0^{u_t}}_{u_t}, \underbrace{0^{w_t}}_{w_t}, \underbrace{\vec{\eta}_i}_{z_t})_{\mathbb{B}_t},$$

if $\rho(i) = \neg (t, \vec{v}_i := (v_{i,1},\ldots,v_{i,n_t}) \in \mathbb{F}_q^{n_t} - \{\vec{0}\}$ such that $v_{i,n_t} \neq 0$), $$c_i := (\underbrace{s_i \vec{v}_i}_{n_t}, \underbrace{s'_i \vec{v}_i}_{n_t}, \underbrace{0^{u_t}}_{u_t}, \underbrace{0^{w_t}}_{w_t}, \underbrace{\vec{\eta}_i}_{z_t})_{\mathbb{B}_t}$$

As described above, Formula 111 is established for the bases B and B* indicated in Formula 110. Hence, Formula 143 means that the coefficient for the basis vector of the basis $B_t$ is set as described below. For the purpose of simple representation, a basis vector $b_{t,i}$ is specified only by its i portion. For example, a basis vector 1 signifies a basis vector $b_{t,1}$. Basis vectors 1, ..., 3 signify basis vectors $b_{t,i}, \ldots, b_{t,3}$, respectively.

When ρ(i) is a positive tuple (t, $\vec{v}_i$), $s_t+\theta_i v_{i,1}$ is set as the coefficient for the basis vector 1. $\theta_i v_{i,2}, \ldots, \theta_i v_{i,nt}$ (where nt represents $n_t$) are each set as the coefficient for basis vectors 2, ..., $n_t$. $s_i'+\theta_i' v_{i,1}$ is set as the coefficient for a basis vector $n_t+1$. $\theta_i' v_{i,2}, \ldots, \theta_i' v_{i,nt}$ (where nt represents $n_t$) are each set as the coefficient for basis vectors $n_t+2, \ldots, 2n_t$. 0 is set as the coefficient for basis vectors $2n_t+1, \ldots, 2n_t+u_t+w_t$. $\eta_{i,1}, \ldots, \eta_{i,zt}$ (where zt represents $z_t$) are each set as the coefficient for basis vectors $2n_t+u_t+w_t+1, \ldots, 2n_t+u_t+w_t+z_t$.

When ρ(i) is a negative tuple ¬ (t, $\vec{v}_i$), $s_i v_{i,1}, \ldots, s_i v_{i,nt}$ (where nt represents $n_t$) are each set as the coefficient for the basis vectors $1, \ldots, n_t$. $s_i' v_{i,1}, \ldots, s_i' v_{i,nt}$ where nt represents $n_t$) are each set as the coefficient for basis vectors $n_t+1, \ldots, 2n_t$. 0 is set as the coefficient for the basis vectors $2n_t+1, \ldots, 2n_t+u_t+w_t$. $\eta_{i,1}, \ldots, \eta_{i,zt}$ (where zt represents $z_t$) are each set as the coefficient for the basis vectors $2n_t+u_t+w_t+1, \ldots, 2n_t+u_t+w_t+z_t$.

(S409: Cipher Element $c_{d+1}$ Generation Step)

With the processing device, the cipher element $c_{d+1}$ generation part 235 generates a cipher element $c_{d+1}$ which is an element of the ciphertext $ct_s$, as indicated in Formula 144.

$$c_{d+1} := g_T^{s0} m \quad [\text{Formula 144}]$$

(S410: Data Transmission Step)

For example, with the communication device, the ciphertext transmission part 240 transmits the ciphertext $ct_s$, including the access structure S:=(M, ρ), the cipher element $c_i$ (i=1, ..., L), and the cipher element $c_{d+1}$, to the decryption device 300 via the network. As a matter of course, the ciphertext $ct_s$ may be transmitted to the decryption device 300 by another method.

In brief, from (S401) through (S409), the encryption device 200 generates the ciphertext $ct_s$ by executing the Enc algorithm indicated in Formula 145. In (S410), the encryption device 200 distributes the generated ciphertext $ct_s$ to the decryption device 300.

[Formula 145]

$\text{Enc}(\text{gparam}, \{apk_t\}, m, \mathbb{S}:=(M, \rho))$:

$\vec{f} \xleftarrow{U} \mathbb{F}_q^r, \vec{s}^T:=(s_1, \ldots, s_L)^T:=M \cdot \vec{f}^T, s_0 = \vec{1} \cdot \vec{f}^T,$ $\vec{f}' \xleftarrow{R} \mathbb{F}_q^r, \; s.t. \; s_0 = \vec{1} \cdot \vec{f}'^T, \vec{s}'^T:=(s_1', \ldots, s_L')^T:=M \cdot \vec{f}'^T,$ $\vec{\eta}_i \xleftarrow{U} \mathbb{F}_q^{z_t} \; (i=1, \ldots, L),$ $\theta_i, \theta_i' \xleftarrow{U} \mathbb{F}_q \; (i=1, \ldots, L), \text{for } i=1, \ldots, L,$ if ρ(i) = (t, $\vec{v}_i$:=($v_{i,1}, \ldots, v_{i,n_t}$)) ∈ $\mathbb{F}_q^{n_t} - \{\vec{0}\}$ such that $v_{i,n_t} \neq 0$), $c_i := (\underbrace{s_t \vec{e}_{t,1} + \theta_i \vec{v}_i}_{n_t}, \underbrace{s_t' \vec{e}_{t,1} + \theta_i' \vec{v}_i}_{n_t}, \underbrace{0^{u_t}}_{u_t}, \underbrace{0^{w_t}}_{w_t}, \underbrace{\vec{\eta}_i}_{z_t})_{\mathbb{B}_t},$ if ρ(i) = ¬ (t, $\vec{v}_i$), $c_i := (\underbrace{s_t \vec{v}_i}_{n_t}, \underbrace{s_t' \vec{v}_i}_{n_t}, \underbrace{0^{u_t}}_{u_t}, \underbrace{0^{w_t}}_{w_t}, \underbrace{\vec{\eta}_i}_{z_t})_{\mathbb{B}_t},$ $c_{d+1} := g_T^{s0} m, ct_\mathbb{S} := (\mathbb{S}, c_1, \ldots, c_L, c_{d+1}).$ return $ct_\mathbb{S}$.

The function and operation of the decryption device 300 will be described.

As shown in FIG. 9, the decryption device 300 is provided with a decryption key reception part 310 (decryption key acquisition part), a data reception part 320 (data acquisition part), a span program calculation part 330, a complementary coefficient calculation part 340, a pairing operation part 350, and a message calculation part 360.

The process of the Dec algorithm will be described with reference to FIG. 14.

(S501: Decryption Key Acquisition Step)

For example, with the communication device, the decryption key acquisition part 310 receives the decryption key $usk_{gid,(t,xt)}$ distributed by the key generation device 100, via the network. The decryption key acquisition part 310 also acquires the authority public key $apk_t$ generated by the key generation device 100.

(S502: Data Reception Step)

For example, with the communication device, the data reception part 320 receives the ciphertext $ct_s$ transmitted by the encryption device 200, via the network.

(S503: Span Program Calculation Step)

With the processing device, the span program calculation part 330 checks whether or not the access structure S included in the ciphertext $ct_s$ received in (S502) accepts the set Γ of the attribute information $\vec{x}_t$ included in the decryption key $usk_{gid,(t,xt)}$ acquired in (S501). The method of checking whether or not the access structure S accepts Γ is the same as that described in "3. Concept for Implementing Functional Encryption".

If the access structure S accepts Γ (accept in S503), the span program calculation part 330 advances the process to (S504). If the access structure S rejects Γ (reject in S503), the span program calculation part 330 judges that the ciphertext $ct_s$ cannot be decrypted with the decryption key $sk_{gid,(t,xt)}$, and ends the process.

(S504: Complementary Coefficient Calculation Step)

With the processing device, the complementary coefficient calculation part 340 calculates I and a constant (complementary coefficient) $\{\alpha_i\}_{i \in I}$, which I and $\{\alpha_i\}_{i \in I}$ satisfying Formula 146.

$$\vec{1} = \Sigma_{i \in I} \alpha_i M_i, \quad [\text{Formula 146}]$$

where $M_i$ is the i-th row of M, and $I \subseteq \{i \in 1, \ldots, L\} | [\rho(i)=(t, \vec{v}_i) \wedge (t, \vec{x}_t) \in \Gamma \wedge \vec{v}_i \cdot \vec{x}_t = 0]$
$\vee [\rho(i)=\neg (t, \vec{v}_i) \wedge (t, \vec{x}_t) \in \Gamma \wedge \vec{v}_i \cdot \vec{x}_t \neq 0]\}$ (S505: Pairing Operation Step)

With the processing device, the pairing operation part 350 calculates Formula 147, thus generating a session key $K=g_T^{s0}$ (where s0 represents $s_0$).

$$K := \prod_{i \in I \wedge \rho(i)=(t,\vec{v}_i)} e(c_i, k_t^*)^{\alpha_i} \cdot \prod_{i \in I \wedge \rho(i)=\neg(t,\vec{v}_i)} e(c_i, k_t^*)^{\alpha_i/(\vec{v}_i \cdot \vec{x}_t)} \quad [\text{Formula 147}]$$

As indicated in Formula 148, the key $K=g_T^{s0}$ (where s0 represents $s_0$) is obtained by calculating Formula 147.

$$\prod_{i \in I \wedge \rho(i)=(t,\vec{v}_i)} e(c_i, k_t^*)^{\alpha_i} \cdot \prod_{i \in I \wedge \rho(i)=\neg(t,\vec{v}_i)} e(c_i, k_t^*)^{\alpha_i/(\vec{v}_i \cdot \vec{x}_t)} = \quad [\text{Formula 148}]$$

$$\prod_{i \in I \wedge \rho(i)=(t,\vec{v}_i)} g_T^{(\delta+1)\alpha_i s_i - \delta \alpha_i s_i'}$$

$$\prod_{i \in I \wedge \rho(i)=\neg(t,\vec{v}_i)} g_T^{((\delta+1)\alpha_i s_i - \delta \alpha_i s_i')(\vec{v}_i \cdot \vec{x}_t)/(\vec{v}_i \cdot \vec{x}_t)} = g_T^{(\delta+1)s_0 - \delta s_0} = g_T^{s_0}.$$

(S506: Message Calculation Step)

The message calculation part 360 generates a message m' (=m) by calculating m'=$c_{d+1}$/K with the processing device.

Note that $c_{d+1}$ is $g_T^{s0} m$ (where s0 represents $s_0$), as indicated in Formula 144. Since K is $g_T^{s0}$ (where s0 represents $s_0$), the message m can be obtained by calculating $m' = c_{d+1}/K$.

In brief, from (S501) through (S506), the decryption device 300 generates the message m' (=m) by executing the Dec algorithm indicated in Formula 149.

[Formula 149]

$$\text{Dec}(\text{gparam}, \{\text{apk}_t, \text{usk}_{gid,(t,\vec{x}_t)} := (\text{gid}, (t, \vec{x}_t), k_t^*)\},$$
$$ct_\mathbb{S} := (\mathbb{S}, c_1, \ldots, c_L, c_{d+1})):$$

if $\mathbb{S} := (M, \rho)$ accepts $\Gamma := \{(t, \vec{x}_t) \in \text{usk}_{gid,(t,x)}\}$, then compute $I$ and $\{\alpha_i\}_{i \in I}$ such that $\vec{1} = \Sigma_{i \in I} \alpha_i M_i$, where $M_i$ is the $i$-th row of $M$, and $I \subseteq \{i \in \{1, \ldots, L\}\} [\rho(i) = (t, \vec{v}_i) \wedge (t, \vec{x}_t) \in \Gamma \wedge \vec{v}_i \cdot \vec{x}_t = 0]$ $\vee [\rho(i) = \neg (t, \vec{v}_i) \wedge (t, \vec{x}_t) \in \Gamma \wedge \vec{v}_i \cdot \vec{x}_t = 0]\}$, $K := \prod_{i \in I \wedge \rho(i)=(t,\vec{v}_i)} e(c_i, k_t^*)^{\alpha_i} \cdot \prod_{i \in I \wedge \rho(i)=\neg (t,\vec{v}_i)} e(c_i, k_t^*)^{\alpha_i / (\vec{v}_i \cdot \vec{x}_t)}$, return $m' := c_{d+1}/K$.

As described above, the cryptographic processing system 10 according to Embodiment 1 implements the multi-authority functional encryption scheme in which the plurality of key generation devices 100 generate decryption keys. In particular, the encryption scheme implemented by the cryptographic processing system 10 is a decentralized multi-authority functional encryption scheme with no central authority.

Note that the cryptographic processing system 10 according to Embodiment 1 implements a functional encryption scheme with a non-monotone predicate.

In the above description, the dimensions $u_t$, $w_t$, and $z_t$ (t=1, ..., d) are provided to enhance the security. Therefore, $u_t$, $w_t$, and $z_t$ (t=1, ..., d) may be each set to 0, that is, the dimensions $u_t$, $w_t$, and $z_t$ (t=1, ..., d) need not be provided, although the security may be degraded.

In the above description, the number of dimensions of each of the basis $B_t$ and the basis $B^*_t$ is set to $N_t = 2n_t + u_t + w_t + z_t$. Alternatively, $2n_t + u_t + w_t + z_t$ may be replaced by $2n_t + 3n_t + 2n_t + 1$ (=7n, +1), so that the number of dimensions of each of the basis $B_t$ and the basis $B^*_t$ may be set to $7n_t + 1$.

In this case, the ASetup algorithm indicated in Formula 131 is rewritten as Formula 150.

[Formula 150]

$$\text{ASetup}(\text{gparam}, t, n_t):$$

$\text{param}_{\mathbb{V}_t} := (q, \mathbb{V}_t, \mathbb{G}_T, \mathbb{A}_t, e) := \mathcal{G}_{dpvs}(1^\lambda, 7n_t + 1, \text{param}_\mathbb{G})$, $\mathbb{U}_j := (u_{j,1}, \ldots, u_{j,7n_t+1})$, where $u_{j,i} := (\overbrace{0, \ldots, 0}^{i-1}, G_j, \overbrace{0, \ldots, 0}^{7n_t+1-i})$ for $j = 0, 1; i = 1, \ldots, 7n_t + 1$, $X_t \xleftarrow{U} GL(7n_t + 1, \mathbb{F}_q)$, $(\mathbb{B}_t, \mathbb{B}^*_t) := (X_t(\mathbb{U}_0), (X_t^T)^{-1}(\mathbb{U}_1))$, $\hat{\mathbb{B}}_t := (b_{t,1}, \ldots, b_{t,2n_t}, b_{t,7n_t+1})$, $\hat{\mathbb{B}}^*_t := (b^*_{t,1}, \ldots, b^*_{t,2n_t}, b^*_{t,5n_t+1}, \ldots, b^*_{t,7n_t})$, $\text{ask}_t := X_t$, $\text{apk}_t := (\text{param}_{\mathbb{V}_t}, \hat{\mathbb{B}}_t)$, return $(\text{ask}_t, \text{apk}_t)$.

The AttrGen algorithm indicated in Formula 136 is rewritten as Formula 151.

[Formula 151]

$$\text{AttrGen}(\text{gparam}, t, \text{ask}_t, \text{gid}, \vec{x}_t := (x_{t,1}, \ldots, x_{t,n_t})$$

$\in \mathbb{F}_q^{n_t} - \{\vec{0}\}$ such that $x_{t,1} := 1$):

$G_{gid}(=\delta G_1) := H(\text{gid}) \in \mathbb{G}$, $\vec{\varphi}_t := (\varphi_{t,1}, \ldots, \varphi_{t,2n_t}) \xleftarrow{U} \mathbb{F}_q^{2n_t}$, $k_t^* := (X_t^T)^{-1}((x_{t,1}(G_{gid} + G_1), \ldots, x_{t,n_t}$ $(G_{gid} + G_1), -x_{t,1} G_{gid}, \ldots, -x_{t,n_t} G_{gid}$, $0^{3n_t}, \varphi_{t,1} G_1, \ldots, \varphi_{t,2n_t} G_1, 0))$, i.e., $k_t^* := (\overbrace{(\delta+1)\vec{x}_t}^{n_t}, \overbrace{-\delta\vec{x}_t}^{n_t}, \overbrace{0^{3n_t}}^{3n_t}, \overbrace{\vec{\varphi}_t}^{2n_t}, \overbrace{0}^{1})_{\mathbb{B}^*_t}$, return $\text{usk}_{gid,(t,x)} := (\text{gid}, (t, \vec{x}_t), k_t^*)$.

The Enc algorithm indicated in Formula 145 is rewritten as Formula 152.

[Formula 152]

$$\text{Enc}(\text{gparam}, \{\text{apk}_t\}, m, \mathbb{S} := (M, \rho)):$$

$\vec{f} \xleftarrow{U} \mathbb{F}_q^r$, $\vec{s}^T := (s_1, \ldots, s_L)^T := M \cdot \vec{f}^T$, $s_0 := \vec{1} \cdot \vec{f}^T$, $\vec{f'} \xleftarrow{R} \mathbb{F}_q^r$, s.t. $s_0 = \vec{1} \cdot \vec{f'}^T$, $\vec{s'}^T := (s'_1, \ldots, s'_L)^T := M \cdot \vec{f'}^T$, $\eta_i, \theta_i, \theta'_i \xleftarrow{U} \mathbb{F}_q (i = 1, \ldots, L)$, for $i = 1, \ldots, L$, if $\rho(i) = (t, \vec{v}_i := (v_{i,1}, \ldots, v_{i,n_t}) \in \mathbb{F}_q^{n_t} \sim \{\vec{0}\}$ such that $v_{i,n_t} \neq 0$), $c_i := (\overbrace{s_i \vec{e}_t, 1 + \theta_i \vec{v}_i}^{n_t}, \overbrace{s'_i \vec{e}_t, 1 + \theta'_i \vec{v}_i}^{n_t}, \overbrace{0^{3n_t}}^{3n_t}, \overbrace{0^{2n_t}}^{2n_t}, \overbrace{\eta_i}^{1})_{\mathbb{B}_t}$, if $\rho(i) = \neg (t, \vec{v}_i)$, $c_i := (\overbrace{s_i \vec{v}_i}^{n_t}, \overbrace{s'_i \vec{v}_i}^{n_t}, \overbrace{0^{3n_t}}^{3n_t}, \overbrace{0^{2n_t}}^{2n_t}, \overbrace{\eta_i}^{1})_{\mathbb{B}_t}$, $c_{d+1} := g_T^{s_0} m$, $ct_\mathbb{S} := (\mathbb{S}, c_1, \ldots, c_L, c_{d+1})$.

return $ct_\mathbb{S}$.

The GSetup algorithm and the Dec algorithm are unchanged.

The GSetup algorithm may be executed only once by one generation device 100 at the setup of the cryptographic processing system 10, and need not be executed every time a decryption key is to be generated. Likewise, the ASetup algorithm may be executed only once by each key generation device 100 at the setup of the cryptographic processing system 10, and need not be executed every time a decryption key is to be generated.

In the above explanation, the GSetup algorithm, the ASetup algorithm, and the KeyGen algorithm are executed by the key generation device 100. Alternatively, the GSetup algorithm, the ASetup algorithm, and the KeyGen algorithm may be executed respectively by different devices.

Embodiment 2

In Embodiment 1, the method of implementing the cryptographic process in the dual vector spaces has been described. In Embodiment 2, a method of implementing a cryptographic process in dual additive groups will be described.

More specifically, in Embodiment 1, the cryptographic process is implemented in the cyclic group of the prime order q. When a ring R is expressed as indicated in Formula 153 using a composite number M, the cryptographic process described in Embodiment 1 can also be applied to an additive group having the ring R as a coefficient.

$$\mathbb{R} := \mathbb{Z}/M\mathbb{Z} \quad \text{[Formula 153]}$$

where $\mathbb{Z}$: an integer; and

M: a composite number

When the decentralized multi-authority functional encryption scheme described in Embodiment 1 is implemented in the additive group having the ring R as a coefficient, then Formulas 154 to 158 are resulted.

[Formula 154]

$$\text{GSetup}(1^\lambda): \text{param}_\mathbb{G} := (q, \mathbb{G}, \mathbb{G}_T, g, e) \xleftarrow{R} \mathcal{G}_{bpg}(1^\lambda),$$
$$H: \{0,1\}^* \to \mathbb{G}; G_0 := H(0^\lambda) \in \mathbb{G}, G_1 := H(1^\lambda) \in \mathbb{G}, g_T := e(G_0, G_1),$$
$$\text{return gparam} := (\text{param}_\mathbb{G}, H, G_0, G_1, g_T).$$

[Formula 155]

$$\text{ASetup}(\text{gparam}, t, n_t, u_t, w_t, z_t):$$
$$N_t := 2n_t + u_t + w_t + z_t,$$
$$\text{param}_{\mathbb{V}_t} := (q, \mathbb{V}_t, \mathbb{G}_T, \mathbb{A}_t, e) := \mathcal{G}_{dpvs}(1^\lambda, N_t, \text{param}_\mathbb{G}),$$
$$\mathbb{U}_j := (u_{j,1}, \ldots, u_{j,N_t}), \text{ where } u_{j,i} = (\overbrace{0, \ldots, 0}^{i-1}, G_j, \overbrace{0, \ldots, 0}^{N_t-i})$$
$$\text{for } j = 0, 1; i = 1, \ldots, N_t,$$
$$X_t \xleftarrow{U} GL(N_t, \mathbb{R}), (\mathbb{B}_t, \mathbb{B}_t^*) := (X_t(\mathbb{U}_0), (X_t^T)^{-1}(\mathbb{U}_1)),$$
$$\hat{\mathbb{B}}_t := (b_{t,1}, \ldots, b_{t,2n_t}, b_{t,2n_t+u_t+w_t+1}, \ldots, b_{t,2n_t+u_t+w_t+z_t}),$$
$$\hat{\mathbb{B}}_t^* := (b_{t,1}^*, \ldots, b_{t,2n_t}^*, b_{t,2n_t+u_t+1}^*, \ldots, b_{t,2n_t+u_t+w_t}^*),$$
$$ask_t := X_t, apk_t := (\text{param}_{\mathbb{V}_t}, \hat{\mathbb{B}}_t),$$
$$\text{return } (ask_t, apk_t).$$

[Formula 156]

$$\text{AttrGen}(\text{gparam}, t, ask_t, gid, \vec{x}_t := (x_{t,1}, \ldots, x_{t,n_t})$$
$$\in \mathbb{R}^{n_t} - \{\vec{0}\} \text{ such that } x_{t,1} := 1):$$
$$G_{gid} (= \delta G_1) := H(gid) \in \mathbb{G}, \vec{\varphi}_t := (\varphi_{t,1}, \ldots, \varphi_{t,w_t}) \xleftarrow{U} \mathbb{R}^{w_t},$$
$$k_t^* := (X_t^T)^{-1}((x_{t,1}(G_{gid}+G_1), \ldots, x_{t,n_t}(G_{gid}+G_1), -x_{t,1}G_{gid}, \ldots, -x_{t,n_t}G_{gid},$$
$$0^{u_t}, \varphi_{t,1}G_1, \ldots, \varphi_{t,w_t}G_1, 0^{z_t})),$$
$$i.e., k_t^* = ((\delta+1)\overrightarrow{x_t}, \overbrace{-\delta x_t}^{n_t}, \overbrace{0^{u_t}}^{u_t}, \overbrace{\vec{\varphi}_t}^{w_t}, \overbrace{0^{z_t}}^{z_t})_{\mathbb{B}_t^*},$$
$$\text{return } usk_{gid,(t,x_t)} := (gid, (t, \vec{x}_t), k_t^*).$$

[Formula 157]

$$\text{Enc}(\text{gparam}, \{apk_t\}, m, \mathbb{S} := (M, \rho)):$$
$$\vec{f} \xleftarrow{U} \mathbb{R}^r, \vec{s}^T := (s_1, \ldots, s_L)^T := M \cdot \vec{f}^T, s_0 := \vec{1} \cdot \vec{f}^T,$$
$$\vec{f'} \xleftarrow{R} \mathbb{R}^r \text{ s.t. } s_0 = \vec{1} \cdot \vec{f'}^T, \vec{s'}^T := (s'_1, \ldots, s'_L)^T := M \cdot \vec{f'}^T,$$
$$\vec{\eta}_i \xleftarrow{U} \mathbb{R}^{z_t} (i = 1, \ldots, L),$$
$$\theta_i, \theta'_i \xleftarrow{U} \mathbb{R} (i = 1, \ldots, L),$$

-continued for $i = 1, \ldots, L$, if $\rho(i) = (t, \vec{v}_i := (v_{i,1}, \ldots, v_{i,n_t})) \in \mathbb{R}^{n_t} - \{\vec{0}\}$ such that $v_{i,n_t} \neq 0$), $$c_i := (\overbrace{s_i e_t, 1 + \theta_i \vec{v}_i}^{n_t}, \overbrace{s'_i e_t, 1 + \theta'_i \vec{v}_i}^{n_t}, \overbrace{0^{u_t}}^{u_t}, \overbrace{0^{w_t}}^{w_t}, \overbrace{\vec{\eta}_i}^{z_t})_{\mathbb{B}_t},$$

if $\rho(i) = \neg (t, \vec{v}_i)$, $$c_i := (\overbrace{s_i \vec{v}_i}^{n_t}, \overbrace{s'_i \vec{v}_i}^{n_t}, \overbrace{0^{u_t}}^{u_t}, \overbrace{0^{w_t}}^{w_t}, \overbrace{\vec{\eta}_i}^{z_t})_{\mathbb{B}_t},$$

$$c_{d+1} := g_T^{s_0} m, \quad ct_\mathbb{S} := (\mathbb{S}, c_1, \ldots, c_L, c_{d+1}).$$
return $ct_\mathbb{S}$.

[Formula 158]

$$\text{Dec}(\text{gparam}, \{apk_t, usk_{gid,(t,x_t)} := (gid, (t, \vec{x}_t), k_t^*)\},$$
$$ct_\mathbb{S} := (\mathbb{S}, c_1, \ldots, c_L, c_{d+1})):$$
if $\mathbb{S} := (M, \rho)$ accepts $\Gamma := \{(t, \vec{x}_t) \in usk_{gid,(t,x_t)}\}$,
then compute $I$ and $\{\alpha_i\}_{i \in I}$ such that
$$\vec{1} = \Sigma_{i \in I} \alpha_i M_i, \text{ where } M_i \text{ is the } i\text{-th row of } M, \text{ and}$$
$$I \subseteq \{i \in \{1, \ldots, L\} \mid [\rho(i) = (t, \vec{v}_i) \wedge (t, \vec{x}_t) \in \Gamma \wedge \vec{v}_i \cdot \vec{x}_t = 0]$$
$$\vee [\rho(i) = \neg (t, \vec{v}_i) \wedge (t, \vec{x}_t) \in \Gamma \wedge \vec{v}_i \cdot \vec{x}_t \neq 0]\},$$
$$K := \prod_{i \in I \wedge \rho(i) = (t, \vec{v}_i)} e(c_i, k_i^*)^{\alpha_i} \cdot \prod_{i \in I \wedge \rho(i) = \neg (t, \vec{v}_i)} e(c_i, k_i^*)^{\alpha_i / (\vec{v}_i \cdot \vec{x}_t)},$$
return $m' := c_{d+1} / K$.

From the viewpoint of security proof, in the above embodiments, $\rho(i)$ for each integer $i=1, \ldots, L$ may be limited to a positive tuple $(t, \vec{v}_i)$ or negative tuple $\neg (t, \vec{v}_i)$ for different identification information t.

In other words, when $\rho(i) = (t, \vec{v}_i)$ or $\rho(i) = \neg (t, \vec{v}_i)$, let a function $\rho$ be map of $\{1, \ldots, L\} \to \{1, \ldots, d\}$ with which $\rho(i) = t$ is established. In this case, $\rho$ may be limited to injection. Note that $\rho(i)$ is $\rho(i)$ in the access structure $S := (M, \rho(i))$ described above.

In the above description, the span program M^ accepts the input sequence δ if and only if linear combination of the rows of the matrix $M_δ$ obtained from the matrix ^ by the input sequence δ gives $\vec{1}$. Alternatively, the span program M^ may accept the input sequence δ if and only if another vector $\vec{h}$ is obtained instead of $\vec{1}$.

In this case, in the Enc algorithm, $s_0 := \vec{h} \cdot \vec{f}^T$ may be set instead of $s_0 := \vec{1} \cdot \vec{f}^T$, and $s_0 := \vec{h} \cdot \vec{f'}^T$ may be set instead of $s_0 := \vec{1} \cdot \vec{f'}^T$.

The hardware configuration of the cryptographic processing system 10 (the key generation device 100, the encryption device 200, and the decryption device 300) in the above embodiments will be described.

FIG. 15 is a diagram showing an example of the hardware configuration of each of the key generation device 100, encryption device 200, and decryption device 300.

As shown in FIG. 15, each of the key generation device 100, encryption device 200, and decryption device 300 includes the CPU 911 (also referred to as a Central Processing Unit, central processing device, processing device, computation device, microprocessor, microcomputer, or processor) which executes programs. The CPU 911 is connected to the ROM 913, the RAM 914, an LCD 901 (Liquid Crystal Display), a keyboard 902 (K/B), the communication board 915, and the magnetic disk device 920 via a bus 912, and controls these hardware devices. In place of the magnetic disk device 920 (fixed disk device), a storage device such as an optical disk device or memory card read/write device may be employed. The magnetic disk device 920 is connected via a predetermined fixed disk interface.

The ROM 913 and the magnetic disk device 920 are examples of a nonvolatile memory. The RAM 914 is an example of a volatile memory. The ROM 913, the RAM 914, and the magnetic disk device 920 are examples of the storage device (memory). The keyboard 902 and the communication board 915 are examples of an input device. The communication board 915 is an example of a communication device. Furthermore, the LCD 901 is an example of a display device.

The magnetic disk device 920, ROM 913, or the like stores an operating system 921 (OS), a window system 922, programs 923, and files 924. The CPU 911, the operating system 921, and the window system 922 execute each program of the programs 923.

The programs 923 store software and programs that execute the functions described as the "master key generation part 110", "master key storage part 120", "information input part 130", "decryption key generation part 140", "key distribution part 150", "public key acquisition part 210", "information input part 220", "ciphertext generation part 230", "ciphertext transmission part 240", "decryption key reception part 310", "data reception part 320", "span program calculation part 330", "complementary coefficient calculation part 340", "pairing operation part 350", "message calculation part 360", and the like in the above description. The programs 923 store other programs as well. The programs are read and executed by the CPU 911.

The files 924 store information, data, signal values, variable values, and parameters such as the "global parameter gparam", "authority public key apk", "authority secret key ask", "decryption key $usk_{gid,(t,xt)}$", "ciphertext $ct_s$", "access structure S", "attribute information", "message m", and the like of the above explanation, as the items of a "file" and "database". The "file" and "database" are stored in a recording medium such as a disk or memory. The information, data, signal values, variable values, and parameters stored in the recording medium such as the disk or memory are read out to the main memory or cache memory by the CPU 911 through a read/write circuit, and are used for the operations of the CPU 911 such as extraction, search, look-up, comparison, computation, calculation, process, output, print, and display. The information, data, signal values, variable values, and parameters are temporarily stored in the main memory, cache memory, or buffer memory during the operations of the CPU 1911 including extraction, search, look-up, comparison, computation, calculation, process, output, print, and display.

The arrows of the flowcharts in the above explanation mainly indicate input/output of data and signals. The data and signal values are stored in the memory of the RAM 914, the recording medium such as an optical disk, or in an IC chip. The data and signals are transmitted online via a transmission medium such as the bus 912, signal lines, or cables; or electric waves.

The "part" in the above explanation may be a "circuit", "device", "equipment", "means" or "function"; or a "step", "procedure", or "process". The "device" may be a "circuit", "equipment", "means", or "function"; or a "step", "procedure", or "process". The "process" may be a "step". Namely, the "part" may be implemented as firmware stored in the ROM 913. Alternatively, the "part" may be practiced as only software; as only hardware such as an element, a device, a substrate, or a wiring line; as a combination of software and hardware; or furthermore as a combination of software, hardware, and firmware. The firmware and software are stored, as programs, in the recording medium such as the ROM 913. The program is read by the CPU 911 and executed by the CPU 911. Namely, the program causes the computer to function as a "part" described above. Alternatively, the program causes the computer or the like to execute the procedure and method of the "part" described above.

REFERENCE SIGNS LIST

100: key generation device; 110: master key generation part; 111: global parameter generation part; 112: authority secret key generation part; 120: master key storage part; 130: information input part; 140: decryption key generation part; 141: random number generation part; 142: key element generation part; 150: key distribution part; 200: encryption device; 210: public key acquisition part; 220: information input part; 221: attribute information input part; 222: message input part; 230: ciphertext generation part; 231: random number generation part; 232: f vector generation part; 233: vector generation part; 234: cipher element $c_i$ generation part; 235: cipher element $c_{d+1}$ generation part; 240: ciphertext transmission part; 300: decryption device; 310: decryption key reception part; 320: data reception part; 330: span program calculation part; 340: complementary coefficient calculation part; 350: pairing operation part; 360: message calculation part

The invention claimed is:

1. A cryptographic processing system having therein at least one of non-transitory computer readable medium and hardware permitting the cryptographic processing system to execute procedures for cryptographic processing, said cryptographic processing system comprising:

d (d is an integer of 1 or more) units of key generation devices, an encryption device, and a decryption device, and serving to execute a cryptographic process using a basis $B_t$ and a basis $B^*_t$ for at least one integer t=1, . . . , d, wherein each key generation device of the d units of the key generation devices of the cryptographic processing system includes a first information input part which takes as input attribute information $\vec{x}_t := (x_{t,i})$ (i=1, . . . , $n_t$ where $n_t$ is an integer of 1 or more) for an integer t among integers t=1, . . . , d which is predetermined for each key generation device, a key element generation part which generates a key element $k^*_t$ including a vector indicated in Formula 1 based on the integer t, the attribute information $\vec{x}_t$ inputted by the first information input part, a predetermined value δ, and a basis vector $b^*_{t,i}$ (i=1, . . . , $2n_t$) of the basis $B^*_t$, and a decryption key transmission part which transmits to the decryption device, a decryption key usk including the key element $k^*_t$ generated by the key element generation part and the attribute information $\vec{x}_t$, wherein the encryption device of the cryptographic processing system includes a second information input part which takes as input a variable ρ(i) for each integer i=1, . . . , L (L is an integer of 1 or more), which variable ρ(i) is either one of a positive tuple (t, $\vec{v}_i$) and a negative tuple ¬(t, $\vec{v}_i$) of the identification information t (t is any one integer of t=1, . . . , d) and attribute information $\vec{v}_i := (v_{i,i'})$ (i'=1, . . . , $n_t$); and a predetermined matrix M having L rows and r columns (r is an integer of 1 or more), a vector generation part which generates a column vector $\vec{s}^T := (s_1, \ldots, s_L)^T := M \cdot \vec{f}^T$ based on a vector $\vec{f}$ having r pieces of elements and the matrix M inputted by the second information input part, and generates a column vector $(\vec{s}')^T := (s_1', \ldots, s_L')^T := M \cdot (\vec{f}')^T$ based on the matrix M and a vector having r pieces of elements and satisfying $s_0 = \vec{h} \cdot (\vec{f}')^T$ where $s_0 = \vec{h} \cdot \vec{f}^T$, a cipher element $c_i$ generation part which, for each integer $i=1, \ldots, L$ and based on the column vector $\vec{s}^T$ and the column vector $(\vec{s}')^T$ which are generated by the vector generation part, and predetermined values $\theta_i$ and $\theta_i'$ for each integer $i=1, \ldots, L$, generates a cipher element $c_i$ including a vector indicated in Formula 2, when the variable $\rho(i)$ is a positive tuple $(t, \vec{v}_i)$, using a basis vector $b_{t,i}(i'=1, \ldots, 2n_t)$ of the basis $B_t$ indicated by identification information t of the positive tuple, and generates a cipher element $c_i$ including a vector indicated in Formula 3, when the variable $\rho(i)$ is a negative tuple $\neg(t, \vec{v}_i)$, using a basis vector $b_{t,i}(i=1, \ldots, 2n_t)$ indicated by identification information t of the negative tuple, and a ciphertext transmission part which transmits to the decryption device, a ciphertext $ct_s$ including: the cipher element $c_i$ generated for each integer $i=1, \ldots, L$ by the cipher element $c_i$ generation part; the variable $\rho(i)$; and the matrix M, and wherein the decryption device of the cryptographic processing system includes a decryption key reception part which receives the decryption key usk transmitted by the decryption key transmission part of at least one key generation device among the d units of key generation devices, a data reception part which receives the ciphertext $ct_s$ transmitted by the ciphertext transmission part, a complementary coefficient calculation part which, based on the attribute information $\vec{x}_t$ included in the decryption key usk received by the decryption key reception part, and the variable $\rho(i)$ included in the ciphertext $ct_s$ received by the data reception part, specifies, among integers $i=1, \ldots, L$, a set I of an integer i for which the variable $\rho(i)$ is a positive tuple $(t, \vec{v}_i)$, the decryption key usk including $\vec{x}_t$ indicated by identification information t of the positive tuple being received by the decryption key reception part, and with which an inner-product of $\vec{v}_i$ of the positive tuple and the attribute information $\vec{x}_t$ indicated by the identification information t of the positive tuple becomes 0, and an integer i for which the variable $\rho(i)$ is a negative tuple $\neg(t, \vec{v}_i)$, the decryption key usk including $\vec{x}_t$ indicated by identification information t of the negative tuple being received by the decryption key reception part, and with which an inner-product of $\vec{v}_i$ of the negative tuple and the attribute information $\vec{x}_t$ indicated by the identification information t of the negative tuple does not become 0; and calculates, concerning i included in the set I specified, a complementary coefficient $\alpha_i$ with which a total of $\alpha_i M_i$ based on $M_i$ which is an element on an i-th row of the matrix M included in the ciphertext $ct_s$ becomes the predetermined vector $\vec{h}$, and a pairing operation part which calculates predetermined information K by conducting a pairing operation indicated in Formula 4 for the cipher element $c_i$ included in the ciphertext $ct_s$ and the key element $k^*_t$ included in the decryption key usk based on the set I and the complementary coefficient $\alpha_i$ which are calculated by the complementary coefficient calculation part, $$((\delta+1)x_{t,1}, \ldots, \overbrace{(\delta+1)x_{t,n_t}}^{n_t}, -\delta x_{t,1}, \ldots, \overbrace{-\delta x_{t,n_t}}^{n_t}, 0, \ldots, 0)_{B^*_t} \quad \text{[Formula 1]}$$

$$(\overbrace{s_i + \theta_i v_{i,1}, \theta_i v_{i,2}, \ldots, \theta_i v_{i,n_t}}^{n_t}, \overbrace{s_i' + \theta_i' v_{i,1}, \theta_i' v_{i,2}, \ldots, \theta_i' v_{i,n_t}}^{n_t}, 0, \ldots, 0)_{B_t} \quad \text{[Formula 2]}$$

$$(\overbrace{s_i v_{i,1}, \ldots, s_i v_{i,n_t}}^{n_t}, \overbrace{s_i' v_{i,1}, \ldots, s_i' v_{i,n_t}}^{n_t}, 0, \ldots, 0)_{B_t} \quad \text{[Formula 3]}$$

$$K := \prod_{i \in I \wedge \rho(i)=(t,\vec{v}_i)} e(c_i, k^*_t)^{\alpha_i} \cdot \prod_{i \in I \wedge \rho(i)=\neg(t,\vec{v}_i)} e(c_i, k^*_t)^{\alpha_i/(\vec{v}_i \cdot \vec{x}_t)}. \quad \text{[Formula 4]}$$

2. The cryptographic processing system according to claim 1, which executes the cryptographic process using, for at least one integer $t=1, \ldots, d$, the basis $B_t$ having at least the basis vector $b_{t,i}(i=1, \ldots 2n_t, \ldots, 2n_t+u_t, 2n_t+u_t+w_t, \ldots, 2n_t+u_t+w_t+z_t)$ (where $u_t$, $w_t$, and $z_t$ are each an integer of 1 or more) and the basis $B^*_t$ having at least the basis vector $b^*_{t,i}$ ($i=1, \ldots, 2n_t, \ldots, 2n_t+u_t, \ldots, 2n_t+u_t+w_t, \ldots, 2n_t+u_t+w_t+z_t$), wherein, in the key generation device of the cryptographic processing system, the key element generation part generates the key element $k^*_t$ indicated in Formula 5 for the integer t based on the attribute information $\vec{x}_t$, the predetermined value $\delta$, and a random number $\phi_{t,i}$ for each integer $i=1, \ldots, w_t$, and wherein, in the encryption device, the cipher element $c_i$ generation part, for each integer $i=1, \ldots, L$ and based on the column vector $\vec{s}^T$ and the column vector $(\vec{s}')^T$, the predetermined values $\theta_i$ and $\theta_i'$ for each integer $i=1, \ldots, L$, and a random number for each integer $i=1, \ldots, L$ and each integer $i'=1, \ldots, z_t$, generates the cipher element $c_i$ indicated in Formula 6 when the variable $\rho(i)$ is a positive tuple $(t, \vec{v}_i)$, and generates the cipher element $c_i$ indicated in Formula 7 when the variable $\rho(i)$ is a negative tuple $\neg(t, \vec{v}_i)$, $$k^*_t = (\overbrace{(\delta+1)x_{t,1}, \ldots, (\delta+1)x_{t,n_t}}^{n_t}, \quad \text{[Formula 5]}$$
$$\overbrace{-\delta x_{t,1}, \ldots, -\delta x_{t,n_t}}^{n_t}, \overbrace{0^{u_t}}^{u_t}, \overbrace{\varphi_{t,1}, \ldots, \varphi_{t,w_t}}^{w_t}, \overbrace{0^{z_t}}^{z_t})_{B^*_t},$$

$$c_i := (\overbrace{s_i + \theta_i v_{i,1}, \theta_i v_{i,2}, \ldots, \theta_i v_{i,n_t}}^{n_t}, \quad \text{[Formula 6]}$$
$$\overbrace{s_i' + \theta_i' v_{i,1}, \theta_i' v_{i,2}, \ldots, \theta_i' v_{i,n_t}}^{n_t}, \overbrace{0^{u_t}}^{u_t}, \overbrace{0^{w_t}}^{w_t}, \overbrace{\eta_{i,1}, \ldots, \eta_{i,z_t}}^{z_t})_{B_t}$$

$$c_i := (\overbrace{s_i v_{i,1}, \ldots, s_i v_{i,n_t}}^{n_t}, \quad \text{[Formula 7]}$$
$$\overbrace{s_i' v_{i,1}, \ldots, s_i' v_{i,n_t}}^{n_t}, \overbrace{0^{u_t}}^{u_t}, \overbrace{0^{w_t}}^{w_t}, \overbrace{\eta_{i,1}, \ldots, \eta_{i,z_t}}^{z_t})_{B_t}.$$

3. The cryptographic processing system according to claim 1, wherein the encryption device of the cryptographic processing system further comprises a cipher element $c_{d+1}$ generation part which generates a cipher element $c_{d+1}$ indicated in Formula 8 and obtained by encrypting a message m, based on the prescribed $s_0$ and a value $g_t$ which is calculated by conducting a pairing operation of the basis vector $b_{t,i}$ of the basis $B_t$ and the basis vector $b^*_{t,i}$ of the basis $B^*_t$ for a predetermined integer i, wherein the ciphertext transmission part transmits to the decryption device, a ciphertext ct including the cipher element $c_i$ and the cipher element $c_{d+1}$ which is generated by the cipher element $c_{d+1}$ generation part, and wherein the decryption device of the cryptographic processing system further includes a message calculation part which calculates the message m by dividing the cipher element $c_{d+1}$ by the predetermined information K calculated by the pairing operation part, $$c_{d+1} := g_T^{s_0} m. \quad \text{[Formula 8]}$$

4. A key generation device which generates a decryption key usk in a cryptographic processing system that executes a cryptographic process using a basis $B_t$ and a basis $B^*_t$ for at least one integer $t=1, \ldots, d$ (d is an integer of 1 or more), the key generation device having therein at least one of non-transitory computer readable medium and hardware permitting the key generation device to execute procedures for key generation and comprising:

- a first information input part of the cryptographic processing system which takes as input attribute information $\vec{x}_t := (x_{t,i})$ ($i=1, \ldots, n_t$ where $n_t$ is an integer of 1 or more) for a predetermined integer t among $t=1, \ldots, d$;
- a key element generation part of the cryptographic processing system which generates a key element $k^*_t$ including a vector indicated in Formula 9 based on the integer t, the attribute information $\vec{x}_t$ inputted by the first information input part, a predetermined value $\delta$, and a basis vector $b^*_{t,i}$ ($i=1, \ldots, 2n_t$) of the basis $B^*_t$; and
- a decryption key transmission part of the cryptographic processing system which transmits to a decryption device, a decryption key usk including the key element $k^*_t$ generated by the key element generation part and the attribute information $\vec{x}_t$, $$\overbrace{((\delta+1)x_{t,1}, \ldots, (\delta+1)x_{t,n_t}}^{n_t}, \overbrace{-\delta x_{t,1}, \ldots, -\delta x_{t,n_t}}^{n_t}, 0, \ldots, 0)_{B^*_t}.$$

5. An encryption device which generates a ciphertext $ct_s$ in a cryptographic processing system that executes a cryptographic process using a basis $B_t$ and a basis $B^*_t$ for at least one integer $t=1, \ldots, d$ (d is an integer of 1 or more), the encryption device having therein at least one of non-transitory computer readable medium and hardware permitting the encryption device to execute procedures for encryption and comprising:

- a second information input part of the cryptographic processing system which takes as input a variable $\rho(i)$ for each integer $i=1, \ldots, L$ (L is an integer of 1 or more), which variable $\rho(i)$ is either one of a positive tuple $(t, \vec{v}_i)$ and a negative tuple $\neg(t, \vec{v}_i)$ of the identification information t (t is any one integer of $t=1, \ldots, d$) and attribute information $\vec{v}_i := (v_{i,i'})$ ($i'=1, \ldots, n_t$ where $n_t$ is an integer of 1 or more); and a predetermined matrix M having L rows and r columns (r is an integer of 1 or more);
- a vector generation part of the cryptographic processing system which generates a column vector $\vec{s}^T := (s_1, \ldots, s_L)^T := M \cdot \vec{f}^T$ based on a vector $\vec{f}$ having r pieces of elements and the matrix M inputted by the second information input part, and generates a column vector $(\vec{s}')^T := (s_1', \ldots, s_L')^T := M \cdot (\vec{f}')^T$ based on the matrix M and a vector $\vec{F}'$ having r pieces of elements and satisfying $s_0 = \vec{h} \cdot (\vec{f}')^T$ where $s_0 = \vec{h} \cdot \vec{f}^T$;
- a cipher element c generation part of the cryptographic processing system which, for each integer $i=1, \ldots, L$ and based on the column vector $\vec{s}^T$ and the column vector $(\vec{s}')^T$ which are generated by the vector generation part, and predetermined values $\theta_i$ and $\theta_i'$ for each integer $i=1, \ldots, L$, generates a cipher element $c_i$ including a vector indicated in Formula 10, when the variable $\rho(i)$ is a positive tuple $(t, \vec{v}_i)$, using a basis vector $b_{t,i'}$ ($i'=1, \ldots, 2n_t$) of the basis $B_t$ indicated by identification information t of the positive tuple, and generates a cipher element $c_i$ including a vector indicated in Formula 11, when the variable $\rho(i)$ is a negative tuple $\neg(t, \vec{v}_i)$, using a basis vector $b_{t,i}$ ($i=1, \ldots, 2n_t$) indicated by identification information t of the negative tuple; and
- a ciphertext transmission part of the cryptographic processing system which transmits to a decryption device, the ciphertext $ct_s$ including: the cipher element $c_i$ generated for each integer $i=1, \ldots, L$ by the cipher element $c_i$ generation part; the variable $\rho(i)$; and the matrix M, $$\overbrace{(s_i + \theta_i v_{i,1}, \theta_i v_{i,2}, \ldots, \theta_i v_{i,n_t}}^{n_t}, \overbrace{s_i' + \theta_i' v_{i,1}, \theta_i' v_{i,2}, \ldots, \theta_i' v_{i,n_t}}^{n_t}, 0, \ldots, 0)_{B_t} \quad \text{[Formula 10]}$$

$$\overbrace{(s_i v_{i,1}, \ldots, s_i v_{i,n_t}}^{n_t}, \overbrace{s_i' v_{i,1}, \ldots, s_i' v_{i,n_t}}^{n_t}, 0, \ldots, 0)_{B_t}. \quad \text{[Formula 11]}$$

6. A decryption device which decrypts a ciphertext $ct_s$ by a decryption key usk in a cryptographic processing system that executes a cryptographic process using a basis $B_t$ and a basis $B^*_t$ for at least one integer $t=1, \ldots, d$ (d is an integer of 1 or more), the decryption device having therein at least one of non-transitory computer readable medium and hardware permitting the decryption device to execute procedures for decryption and comprising:

[Formula 9]

- a decryption key reception part of the cryptographic processing system which receives the decryption key usk including, for at least one of integers t of $t=1, \ldots, d$, attribute information $\vec{x}_t := (x_{t,i})$ ($i=1, \ldots, n_t$ where $n_t$ is an integer of 1 or more) and a key element $k^*_t$ which is generated to include a vector indicated in Formula 12;
- a data reception part of the cryptographic processing system which receives the ciphertext $ct_s$ including: a variable $\rho(i)$ for each integer $i=1, \ldots, L$ (L is an integer of 1 or more), which variable $\rho(i)$ is either one of a positive tuple $(t, \vec{v}_i)$ and a negative tuple $\neg(t, \vec{v}_i)$ of identification information t (t is any one integer of $t=1, \ldots, d$) and attribute information $\vec{V}_i := (v_{i,i'})$ ($i'=1, \ldots, n_t$); a predetermined matrix M having L rows and r columns (r is an integer of 1 or more); and a cipher element $c_i$ generated to include a vector indicated in Formula 13 for each integer $i=1, \ldots, L$;
- a complementary coefficient calculation part of the cryptographic processing system which, based on the attribute information $\vec{x}_t$ included in the decryption key usk received by the decryption key reception part, and the variable $\rho(i)$ included in the ciphertext $ct_s$ received by the data reception part, specifies, among integers $i=1, \ldots, L$, a set I of an integer i for which the variable $\rho(i)$ is a positive tuple $(t, \vec{v}_i)$, the decryption key usk including $\vec{x}_t$ indicated by identification information t of the positive tuple being received by the decryption key reception part, and with which an inner-product of $\vec{v}_i$ of the positive tuple and the attribute information $\vec{x}_t$ indicated by the identification information t of the positive tuple becomes 0, and an integer i for which the variable ρ(i) is a negative tuple ¬(t, $\vec{v}_i$), the decryption key usk including $\vec{x}_t$ indicated by identification information t of the negative tuple being received by the decryption key reception part, and with which an inner-product of $\vec{v}_i$ of the negative tuple and the attribute information $\vec{x}_t$ indicated by the identification information t of the negative tuple does not become 0; and calculates, concerning i included in the set I specified, a complementary coefficient $\alpha_i$ with which a total of $\alpha_i M_i$ based on $M_i$ which is an element on an i-th row of the matrix M included in the ciphertext $ct_s$ becomes a predetermined vector $\vec{h}$; and a pairing operation part of the cryptographic processing system which calculates predetermined information K by conducting a pairing operation indicated in Formula 14 for the cipher element $c_i$ included in the ciphertext $ct_s$ and the key element $k^*_t$ included in the decryption key usk based on the set I and the complementary coefficient $\alpha_i$ which are calculated by the complementary coefficient calculation part, $$\overline{((\delta+1)x_{t,1}, \ldots, \overset{n_t}{(\delta+1)x_{t,n_t}}, -\delta x_{t,1}, \ldots, \overset{n_t}{-\delta x_{t,n_t}}, 0, \ldots, 0)}_{B^*_t} \quad [\text{Formula 12}]$$

where δ is a predetermined value

[Formula 13]

if $\rho(i) = (t, \vec{v}_i)$, $$\overline{(s_i + \theta_i v_{i,1}, \theta_i v_{i,2}, \ldots, \overset{n_t}{\theta_i v_{i,n_t}},}$$
$$\overline{s'_i + \theta'_i v_{i,1}, \theta'_i v_{i,2}, \ldots, \overset{n_t}{\theta'_i v_{i,n_t}}, 0, \ldots, 0)}_{B_t},$$

if $\rho(i) = \neg(t, \vec{v}_i)$, $$\overline{(s_i v_{i,1}, \ldots, \overset{n_t}{s_i v_{i,n_t}}, s'_i v_{i,1}, \ldots, \overset{n_t}{s'_i v_{i,n_t}}, 0, \ldots, 0)}_{B_t}$$

where $\vec{s}^T := (s_1, \ldots, s_L)^T := M \cdot \vec{f}^T$, $\vec{f}$ is a predetermined vector having r pieces of elements, $s_0 = \vec{h} \cdot \vec{f}^T$, $\vec{h}$ is a predetermined vector having r pieces of elements, $\vec{f}'$ is a predetermined vector that satisfies $s_0 = \vec{h} \cdot \vec{f}'^T$, $\vec{s}'^T := (s'_1, \ldots, s'_L)^T := M \cdot \vec{f}'^T$, $\vec{s}'^T := (s'_1, \ldots, s'_L)^T := M \cdot \vec{f}'^T$, and $\theta_i$, $\theta'_i$ are predetermined values $$K := \prod_{i \in I \wedge \rho(i)=(t, \vec{v}_i)} e(c_i, k^*_t)^{\alpha_i} \cdot \prod_{i \in I \wedge \rho(i)=\neg(t, \vec{v}_i)} e(c_i, k^*_t)^{\alpha_i/(\vec{v}_i \cdot \vec{x}_t)}. \quad [\text{Formula 14}]$$

7. A non-transitory computer readable medium programmed with a cryptographic processing method of executing a cryptographic process using a basis $B_t$ and a basis $B^*_t$ for at least one integer t=1, . . . , d (d is an integer of 1 or more), the cryptographic processing method comprising:

a first information input step of, with at least one key generation device among a plurality of key generation devices, taking as input attribute information $\vec{x}_t := (x_{t,i})$ (i=1, . . . , $n_t$ where $n_t$ is an integer of 1 or more) for an integer t among integers t=1, . . . , d which is predetermined for each of the key generation devices;

a key element generation step of, with the at least one key generation device, generating a key element $k^*_t$ including a vector indicated in Formula 15 based on the integer t, the attribute information $\vec{x}_t$ inputted in the first information input step, a predetermined value δ, and a basis vector $b^*_{t,i}$ (i=1, . . . , $2n_t$) of the basis $B^*_t$;

a decryption key transmission step of, with the at least one key generation device, transmitting to a decryption device, a decryption key usk including the key element $k^*_t$ generated in the key element generation step and the attribute information $\vec{x}_t$;

a second information input step of, with an encryption device, taking as input a variable ρ(i) for each integer i=1, . . . , L (L is an integer of 1 or more), which variable ρ(i) is either one of a positive tuple (t, $\vec{v}_i$) and a negative tuple ¬(t, $\vec{v}_i$) of the identification information t (t is any one integer of t=1, . . . , d) and attribute information $\vec{v}_i := (v_{i,i'})$ (i'=1, . . . , $n_t$); and a predetermined matrix M having L rows and r columns (r is an integer of 1 or more);

a vector generation step of, with the encryption device, generating a column vector $\vec{s}^T := (s_1, \ldots s_L)^T := M \cdot \vec{f}^T$ based on a vector $\vec{f}$ having r pieces of elements and the matrix M inputted in the second information input step, and generating a column vector $(\vec{s}')^T := (s'_1, \ldots, s'_L)^T := M \cdot (\vec{f}')^T$ based on the matrix M and a vector $\vec{F}'$ having r pieces of elements and satisfying $s_0 = \vec{h} \cdot (\vec{f}')^T$ where $s_0 = \vec{h} \cdot \vec{f}^T$;

a cipher element $c_i$ generation step of, with the encryption device, for each integer i=1, . . . , L and based on the column vector $\vec{s}^T$ and the column vector $(\vec{s}')^T$ which are generated in the vector generation step, and predetermined values $\theta_i$ and $\theta_i'$ for each integer i=1, . . . , L, generating a cipher element $c_i$ including a vector indicated in Formula 16, when the variable ρ(i) is a positive tuple (t, $\vec{v}_i$), using a basis vector $b_{t,i'}$ (i'=1, . . . , $2n_t$) of the basis $B_t$ indicated by identification information t of the positive tuple, and generating a cipher element $c_i$ including a vector indicated in Formula 17, when the variable ρ(i) is a negative tuple ¬(t, $\vec{v}_i$), using a basis vector $b_{t,i}$ (i=1, . . . , $2n_t$) indicated by identification information t of the negative tuple;

a ciphertext transmission step of, with the encryption device, transmitting to the decryption device, a ciphertext $ct_s$ including: the cipher element c generated for each integer i=1, . . . , L in the cipher element c generation step; the variable ρ(i); and the matrix M;

a decryption key reception step of, with the decryption device, receiving the decryption key usk transmitted in the decryption key transmission step of the at least one key generation device among the plurality of key generation devices;

a data reception step of receiving the ciphertext $ct_s$ transmitted in the ciphertext transmission step;

a complementary coefficient calculation step of, with the decryption device and based on the attribute information $\vec{x}_t$ included in the decryption key usk received in the decryption key reception step, and the variable ρ(i) included in the ciphertext $ct_s$ received in the data reception step, specifying, among integers i=1, . . . , L, a set I of an integer i for which the variable ρ(i) is a positive tuple (t, $\vec{v}_i$), the decryption key usk including $\vec{x}_t$ indicated by identification information t of the positive tuple being received in the decryption key reception step, and with which an inner-product of $\vec{v}_i$ of the positive tuple and the attribute information $\vec{x}_t$ indicated by the identification information t of the positive tuple becomes 0, and an integer i for which the variable ρ(i) is a negative tuple ¬(t, $\vec{v}_i$), the decryption key usk including $\vec{x}_t$ indicated by identification information t of the negative tuple being received in the decryption key reception step, and with which an inner-product of $\vec{v}_i$ of the negative tuple and the attribute information $\vec{x}_t$ indicated by the identification information t of the negative tuple does not become 0; and calculating, concerning i included in the set I specified, a complementary coefficient $\alpha_i$ with which a total of $\alpha_i M_i$ based on $M_i$ which is an element on an i-th row of the matrix M included in the ciphertext $ct_s$ becomes a predetermined vector $\vec{h}$; and a pairing operation step of, with the decryption device, calculating predetermined information K by conducting a pairing operation indicated in Formula 18 for the cipher element $c_i$ included in the ciphertext $ct_s$ and the key element $k^*_t$ included in the decryption key usk based on the set I and the complementary coefficient $\alpha_i$ which are calculated in the complementary coefficient calculation step, $$((\delta+1)x_{t,1}, \ldots, \overbrace{(\delta+1)x_{t,n_t}}^{n_t}, -\delta x_{t,1}, \ldots, \overbrace{-\delta x_{t,n_t}}^{n_t}, 0, \ldots, 0)_{B^*_t} \quad [\text{Formula 15}]$$

$$(s_i + \theta_i v_{i,1}, \theta_i v_{i,2}, \ldots, \overbrace{\theta_i v_{i,n_t}}^{n_t}, s'_i + \theta'_i v_{i,1}, \theta'_i v_{i,2}, \ldots, \overbrace{\theta'_i v_{i,n_t}}^{n_t}, 0, \ldots, 0)_{B_t} \quad [\text{Formula 16}]$$

$$(s_i v_{i,1}, \ldots, \overbrace{s_i v_{i,n_t}}^{n_t}, s'_i v_{i,1}, \ldots, \overbrace{s'_i v_{i,n_t}}^{n_t}, 0, \ldots, 0)_{B_t} \quad [\text{Formula 17}]$$

$$K := \prod_{i \in I \wedge \rho(i)=(t,\vec{v}_i)} e(c_i, k^*_t)^{\alpha_i} \cdot \prod_{i \in I \wedge \rho(i)=\neg(t,\vec{v}_i)} e(c_i, k^*_t)^{\alpha_i/(\vec{v}_i \cdot \vec{x}_t)}. \quad [\text{Formula 18}]$$

8. A non-transitory computer readable medium programmed with a cryptographic processing program which, upon execution on a computer, causes the computer to execute procedures for cryptographic processing, comprising:

a key generation program to run on d (d is an integer of 1 or more) units of key generation devices, an encryption program to run on an encryption device, and a decryption program to run on a decryption device, and serving to execute a cryptographic process using a basis $B_t$ and a basis $B^*_t$ for at least one integer t=1, ..., d, wherein the key generation program, upon reading the computer readable medium, causes the computer to execute a first information input process of taking as input attribute information $\vec{x}_t := (x_{t,i})$ (i=1, ..., $n_t$ where $n_t$ is an integer of 1 or more) for an integer t among integers t=1, ..., d which is predetermined for each of the key generation devices, a key element generation process of generating a key element $k^*_t$ including a vector indicated in Formula 19 based on the integer t, the attribute information $\vec{x}_t$ inputted in the first information input process, a predetermined value δ, and a basis vector $b^*_{t,i}$ (i=1, ..., $2n_t$) of the basis $B^*_t$, and a decryption key transmission process of transmitting to the decryption device, a decryption key usk including the key element $k^*_t$ generated in the key element generation process and the attribute information $\vec{x}_t$, wherein the encryption program, upon reading the computer readable medium, causes the computer to execute a second information input process of taking as input a variable ρ(i) for each integer i=1, ..., L (L is an integer of 1 or more), which variable ρ(i) is either one of a positive tuple (t, $\vec{v}_i$) and a negative tuple ¬(t, $\vec{v}_i$) of the identification information t (t is any one integer of t=1, ..., d) and attribute information $\vec{v}_i := (v_{i,i'})$ (i'=1, ..., $n_t$); and a predetermined matrix M having L rows and r columns (r is an integer of 1 or more), a vector generation process of generating a column vector $\vec{s}^T := (s_1, \ldots, s_L)^T := M \cdot \vec{f}^T$ based on a vector $\vec{f}$ having r pieces of elements and the matrix M inputted in the second information input process, and generating a column vector $(\vec{s}')^T := (s'_1, \ldots, s'_L)^T := M \cdot (\vec{f}')^T$ based on the matrix M and a vector $\vec{f}'$ having r pieces of elements and satisfying $s_0 = \vec{h} \cdot (\vec{f}')^T$ where $s_0 = \vec{h} \cdot \vec{f}^T$, a cipher element $c_i$ generation process of, for each integer i=1, ..., L and based on the column vector $\vec{s}^T$ and the column vector $(\vec{s}')^T$ which are generated in the vector generation process, and predetermined values $\theta_i$ and $\theta'_i$ for each integer i=1, ..., L, generating a cipher element $c_i$ including a vector indicated in Formula 20, when the variable ρ(i) is a positive tuple (t, $\vec{v}_i$), using a basis vector $b_{t,i}$ (i'=1, ..., $2n_t$) of the basis $B_t$ indicated by identification information t of the positive tuple, and generating a cipher element $c_i$ including a vector indicated in Formula 21, when the variable ρ(i) is a negative tuple ¬(t, $\vec{v}_i$), using a basis vector $b_{t,i}$ (i'=1, ..., $2n_t$) indicated by identification information t of the negative tuple, and a ciphertext transmission process of transmitting to the decryption device, a ciphertext $ct_s$ including: the cipher element $c_i$ generated for each integer i=1, ..., L in the cipher element $c_i$ generation process; the variable ρ(i); and the matrix M, and wherein the decryption program, upon reading the computer readable medium, causes the computer to execute a decryption key reception process of receiving the decryption key usk transmitted in the decryption key transmission process, a data reception process of receiving the ciphertext $ct_s$ transmitted in the ciphertext transmission process, a complementary coefficient calculation process of, based on the attribute information $\vec{x}_t$ included in the decryption key usk received in the decryption key reception process, and the variable ρ(i) included in the ciphertext $ct_s$ received in the data reception process, specifying, among integers i=1, ..., L, a set I of an integer i for which the variable ρ(i) is a positive tuple (t, $\vec{v}_i$), the decryption key usk including $\vec{x}_t$ indicated by identification information t of the positive tuple being received in the decryption key reception process, and with which an inner-product of $\vec{v}_i$ of the positive tuple and the attribute information $\vec{x}_t$ indicated by the identification information t of the positive tuple becomes 0, and an integer i for which the variable ρ(i) is a negative tuple ¬(t, $\vec{v}_i$), the decryption key usk including $\vec{x}_t$ indicated by identification information t of the negative tuple being received in the decryption key reception process, and with which an inner-product of $\vec{v}_i$ of the negative tuple and the attribute information $\vec{x}_t$ indicated by the identification information t of the negative tuple does not become 0; and calculating, concerning i included in the set I specified, a complementary coefficient $\alpha_i$ with which a total of $\alpha_i M_i$ based on $M_i$ which is an element on an i-th row of the matrix M included in the ciphertext $ct_s$ becomes a predetermined vector $h^{\rightarrow}$, and a pairing operation process of calculating predetermined information K by conducting a pairing operation indicated in Formula 22 for the cipher element $c_i$ included in the ciphertext $ct_s$ and the key element $k^*_t$ included in the decryption key usk based on the set I and the complementary coefficient $\alpha_i$ which are calculated in the complementary coefficient calculation process, $$(\overbrace{(\delta+1)x_{t,1}, \ldots, (\delta+1)x_{t,n_t}}^{n_t}, \overbrace{-\delta x_{t,1}, \ldots, -\delta x_{t,n_t}}^{n_t}, 0, \ldots, 0)_{B^*_t} \quad \text{[Formula 19]}$$

$$(\overbrace{s_i + \theta_i v_{i,1}, \theta_i v_{i,2}, \ldots, \theta_i v_{i,n_t}}^{n_t}, \overbrace{s'_i + \theta'_i v_{i,1}, \theta'_i v_{i,2}, \ldots, \theta'_i v_{i,n_t}}^{n_t}, 0, \ldots, 0)_{B_t} \quad \text{[Formula 20]}$$

$$(\overbrace{s_i v_{i,1}, \ldots, s_i v_{i,n_t}}^{n_t}, \overbrace{s'_t v_{i,1}, \ldots, s' v_{i,n_t}}^{n_t}, 0, \ldots, 0)_{B_t} \quad \text{[Formula 21]}$$

$$K := \prod_{i \in I \wedge \rho(i)=(t,\vec{v}_i)} e(c_i, k^*_t)^{\alpha_i} \cdot \prod_{i \in I \wedge \rho(i)=\neg(t,\vec{v}_i)} e(c_i, k^*_t)^{\alpha_i/(\vec{v}_i \cdot \vec{x}_t)}. \quad \text{[Formula 22]}$$

* * * * *